United States Patent
Tsukagoshi

Patent Number: 6,115,077
Date of Patent: Sep. 5, 2000

[54] APPARATUS AND METHOD FOR ENCODING AND DECODING DIGITAL VIDEO DATA OPERABLE TO REMOVE NOISE FROM SUBTITLE DATE INCLUDED THEREWITH

[75] Inventor: Ikuo Tsukagoshi, Tokyo, Japan

[73] Assignee: Sony Corporation, Tokyo, Japan

[21] Appl. No.: 08/691,895

[22] Filed: Aug. 1, 1996

[30] Foreign Application Priority Data

Aug. 4, 1995 [JP] Japan ................................ 7-218239

[51] Int. Cl.[7] ........................................ H04N 5/21
[52] U.S. Cl. ...................... 348/607; 348/589; 348/597; 348/600; 382/266
[58] Field of Search ........................ 348/473, 478, 348/563, 589, 597, 600, 468, 606, 607, 722, 608; 382/266, 200, 275, 203, 199

[56] References Cited

U.S. PATENT DOCUMENTS

| | | | |
|---|---|---|---|
| 3,737,855 | 6/1973 | Cutaia | 382/275 |
| 4,573,070 | 2/1986 | Cooper | 358/36 |
| 4,962,542 | 10/1990 | Klees | 348/607 |
| 5,023,919 | 6/1991 | Wataya | 382/54 |
| 5,029,226 | 7/1991 | Klein et al. | 382/275 |
| 5,185,808 | 2/1993 | Cok | 348/597 |
| 5,245,677 | 9/1993 | Lepore et al. | 382/275 |
| 5,392,137 | 2/1995 | Okubo | 385/462 |
| 5,442,393 | 8/1995 | Yamanaka et al. | 348/606 |
| 5,485,529 | 1/1996 | Kurita et al. | 382/266 |
| 5,568,167 | 10/1996 | Galbi et al. | 348/589 |
| 5,598,226 | 1/1997 | Kokaram | 348/607 |
| 5,606,631 | 2/1997 | Weiss et al. | 382/275 |
| 5,652,628 | 7/1997 | Toyoshima et al. | 348/563 |
| 5,671,019 | 9/1997 | Isoe et al. | 348/563 |
| 5,982,459 | 11/1999 | Fandrianto et al. | 348/845.2 |

Primary Examiner—Andrew I. Faile
Assistant Examiner—Reuben M. Brown
Attorney, Agent, or Firm—Frommer Lawrence & Haug, LLP.; William S. Frommer; Dennis M. Smid

[57] ABSTRACT

Apparatus and method for encoding and decoding digital video data having subtitle data included therewith and which is operable to remove noise from the subtitle data utilizing correlations between a pixel of the subtitle represented by the subtitle data and adjacent pixels of the subtitle. Particularly, subtitle pixels that represent noise in the subtitle are changed to background level pixels when vertically or horizontally aligned pixels adjacent to the noise pixels are background level pixels. During decoding of the digital video data, the subtitle represented by the subtitle data having the noise removed therefrom is superimposed on the video image represented by the digital video data.

32 Claims, 22 Drawing Sheets transfer format

Player internal block diagram

FIG. 5

Table of contents in CD

| subcode frame # | POINT | PMIN, PSEC, PFRAME |
|---|---|---|
| N | x x x x x x x x | xx, yy, zz |
| N+1 | x x x x x x x x | xx, yy, zz |
| N+2 | x x x x x x x x | xx, yy, zz |
| N+3 | x x x x x x x x | xx, yy, zz |

(A)

Table of contents

| STREAM | FRAME | START_SECTOR_ADDRESS | END_SECTOR_ADDRESS |
|---|---|---|---|
| video | V | x x x x x x x x | x x x x x x x x |
| | V+1 | x x x x x x x x | x x x x x x x x |
| | V+2 | x x x x x x x x | x x x x x x x x |
| | V+3 | x x x x x x x x | x x x x x x x x |
| audio | A | x x x x x x x x | x x x x x x x x |
| | A+1 | x x x x x x x x | x x x x x x x x |
| | A+2 | x x x x x x x x | x x x x x x x x |
| subtitle | S | x x x x x x x x | x x x x x x x x |
| | S+1 | x x x x x x x x | x x x x x x x x |
| | S+2 | x x x x x x x x | x x x x x x x x |

(B)

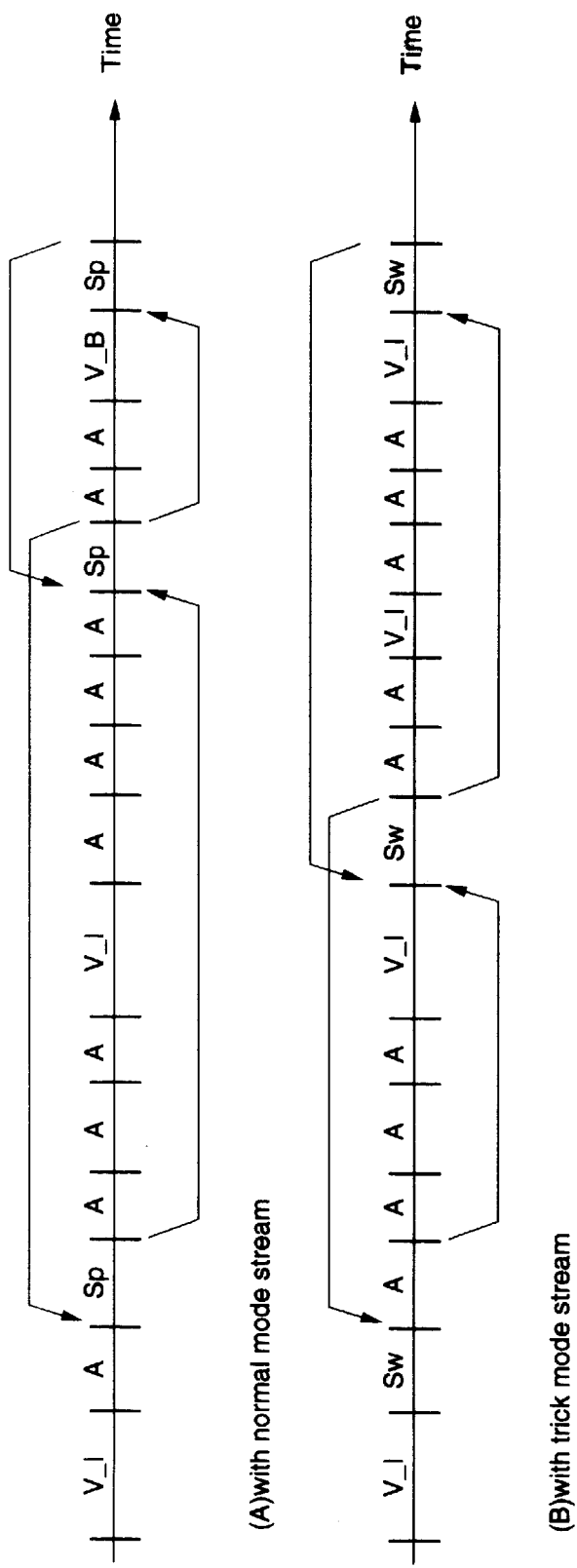

FIG. 7

(1) from system controller 14

| name | bits | description | rate |
|---|---|---|---|
| reset | 1 | system reset | |
| buffer clear | 1 | error in code data, instruction from system controller to throw away data | max30Hz |
| decode start | 1 | decode start (start of code buffer read) | max30Hz |
| stream_select | 5 | designate stream including identification of normal playback/special playback | static |
| ch_select | 5 | decode channel designation | static |
| special | 1 | special playback | as it happens |
| repeat time | 8 | display time during special playback | as it happens |
| xsqueeze | 1 | during 16:9 monitor use | static |
| on/off | 1 | subtitles superimpose on/off | static |
| u_position | 8 | user designated display position (screen vertical direction) | static |

(2) to system controller 14

| name | bits | description | rate |
|---|---|---|---|
| PTSS | 33 | time stamp for subtitle display time | max30Hz |
| buffer overflow | 1 | two banks of data present within the buffer | max30Hz |
| buf write term | 1 | writing of data for one bank completed | max30Hz |
| header error | 1 | error in header | max30Hz |
| data error | 1 | error in data | max30Hz |
| special_ack | 1 | ACK for special playback | as it happens |
| repeat | 8 | display time (both normal and special) | max30Hz |
| V. position | 8 | display position at time of encoding | max30Hz |
| fade factor | 4 | fade-in/out time | max30Hz |

FIG. 8

................................................
(1)(2) : 8bit bus+4bit select+1bit I/O
other : real signal bits
................................................

| (3) from generator | bits |
|---|---|
| H sync | 1 |
| V sync | 1 |
| 13. 5Mbz clock | 1 |

| (4) from demux | |
|---|---|
| data stream | 8 |
| strobe | 1 |
| error | 1 |

| (5) to code buffer | |
|---|---|
| address | 15 |
| data | 8 |
| xce | 1 |
| xwe | 1 |
| xoe | 1 |

| (6) from video decoder | |
|---|---|
| video data (4 : 2 : 2) | 16 |

| (7) to DAC | |
|---|---|
| video data (4 : 2 : 2) | 16 |

FIG. 10

| Addr | Y | Cr | Cb | K |
|---|---|---|---|---|
| 0 | 00 | 7F | 7F | 00 |
| 1 | 00 | 7F | 7F | 20 |
| 2 | 00 | 7F | 7F | 40 |
| ⋮ | | | | |
| 6 | 00 | 7F | 7F | C0 |
| 7 | 00 | 7F | 7F | E0* |
| 8 | 00 | 7F | 7F | E0 |
| 9 | 20 | 7F | 7F | E0 |
| ⋮ | | | | |
| E | C0 | 7F | 7F | E0 |
| F | E0 | 7F | 7F | E0 |

*E0 : subtitle data 100%
: video data 0%

FIG. 13

Color Look Up Table

| Addr | Y  | Cr | Cb | K  |
|------|----|----|----|----|
| 0    | 00 | 7F | 7F | 00 |
| 1    | 20 | 7F | 7F | 40 |
| 2    | 40 | 7F | 7F | 80 |
| 3    | 60 | 7F | 7F | C0 |
| 4    | 80 | 7F | 7F | F0 |
| 5    | A0 | 7F | 7F | F0 |
| 6    | C0 | 7F | 7F | F0 |
| 7    | E0 | 7F | 7F | F0 |
| 8    | 00 | FF | FF | 00 |
| 9    | 20 | FF | FF | 40 |
| A    | 40 | FF | FF | 80 |
| B    | 60 | FF | FF | C0 |
| C    | 80 | FF | FF | F0 |
| D    | A0 | FF | FF | F0 |
| E    | C0 | FF | FF | F0 |
| F    | E0 | FF | FF | F0 |

Subtitle decoder buffer model

BLOCK DIAGRAM FOR CLUT SWITCHING

FIG. 22
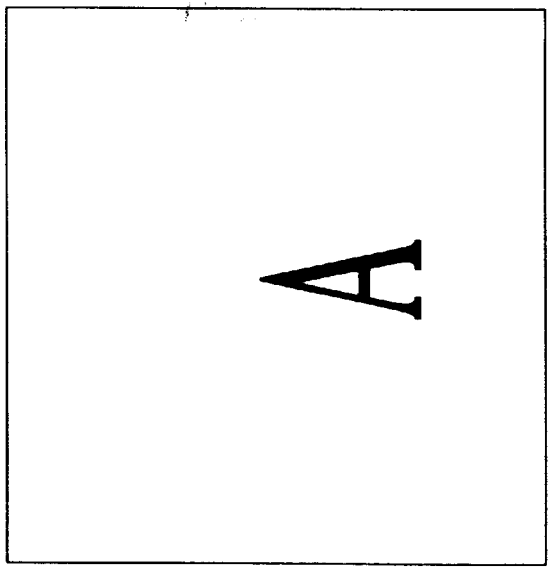
(B)
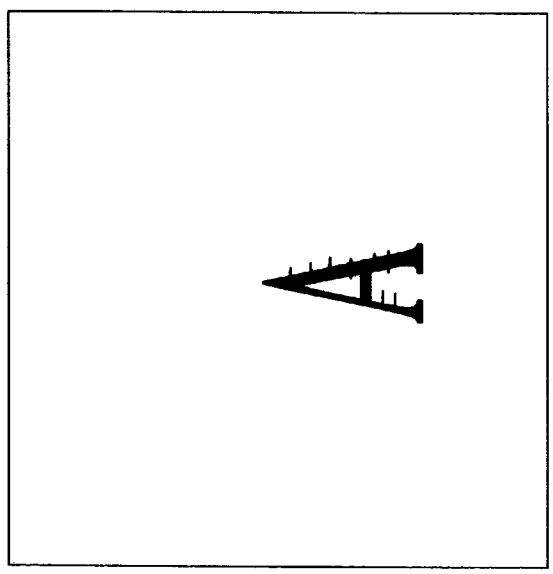
(A)

APPARATUS AND METHOD FOR ENCODING AND DECODING DIGITAL VIDEO DATA OPERABLE TO REMOVE NOISE FROM SUBTITLE DATE INCLUDED THEREWITH

BACKGROUND OF THE INVENTION

The present invention relates to apparatus and method for encoding and decoding digital video data and, more particularly, to apparatus and method for encoding and decoding digital video data which removes noise from subtitle data included therewith.

As is known, subtitle data which represent subtitles that are to be superimposed on a video picture are stored with the video signal prior to the recording or transmission thereof. In one system, known as the CAPTAIN system, subtitles are transmitted as a character code of dot patterns. In the known data format CD-G (compact disk graphics), graphic images as well as subtitle data are stored in the subcode region of the data format. As shown in FIGS. 1(a) to 1(c), which schematically illustrate the data structure of the CD-G format, one block of data is comprised of 98 frames which are each comprised of a one byte sub code area followed by 32 bytes of data. The 32 bytes of data in one frame are comprised of 6 four-byte samples and 8 bytes of error correction code, as shown in FIG. 1(A), and each sample is comprised of two bytes of L channel data and two bytes of R channel data. As shown in FIG. 1(b), one block is comprised of 98 frames, i.e., frames 0 to 97, and each block also is divided into 8 channels P, Q, R, S, T, U, V and W, such as shown in FIG. 1(c). The subcode data of frames 0 and 1 are stored as sync patters S0 and S1 in each of the 8 channels P to W, and the sync patterns in channels R to W each are followed by a 96 byte data area in which data of frames 2–97 are stored. Channels P and Q, following sync patterns S0 and S1, generally include "search" data which are utilized for searching tracks, and graphics data generally is stored after sync patterns S0 and S1 in channels R to W. Thus, 96 bits per channel×6 channels R to W=576 bits of graphics data are stored in each block. Further, when each block is transmitted at the cyclic frequency of 75 Hz, the data transmission rate for a block is 7.25 KHz (75 Hz×98 bytes), which results in the subcode transmission bit rate of 7.35 kbs (kilobytes per second).

FIG. 2 schematically illustrates the transmission format of channels R to W shown in FIG. 1, wherein a transmitted "symbol" is comprised of the combination of a single bit from each of the channels R to W, a transmitted "packet" is comprised of 96 symbols, and a transmitted "pack" is comprised of 24 symbols 0 to 23. The three bits of channels R, S and T of symbol 0 of each of the packs are reserved for "mode" data, and the 3 bits of channels U, V and W of symbol 0 of each of the packs are reserved for "item" data. Table 1, shown below, shows the various data modes as defined by the mode data and the item data.

TABLE 1

| Mode | Item | Data Mode |
|------|------|-----------|
| 000  | 000  | 0 mode |
| 001  | 000  | graphics mode |
| 001  | 001  | TV graphics mode |
| 111  | 000  | user mode |

Instruction information is stored in symbol 1 of each of the packs and parity and other additional information are stored in symbols 2 to 7 of each pack. Graphics data generally are stored in symbols 8 to 19 of each pack, and error correction code are stored in the remaining symbols 20 to 23 of each pack.

In the above discussed format, each pack can store 6×12=72 bits of graphics data or 72 pixels of graphics data. If a single character is stored in symbols 8–19 (6 bits×12 symbols) of each pack, then 300 characters are transmitted per second at the bit transmission rate of 75 Hz. In the CD-G format, a single picture is comprised of 192 lines wherein each line includes 288 horizontal pixels and, thus, each picture is transmitted in 2.56 seconds, as shown in equation 1.

$$(288/6) \times (192/12)/300 = 2.56 (\text{sec}) \qquad (1)$$

If each pixel value is expressed in hexadecimal form, and each hexadecimal representation of 1 pixel requires 4 bits, the amount of time required to transmit a single picture is approximately 10.24 seconds.

In the CAPTAIN System, 192 lines (248 horizontal pixels each) are displayed for each picture, but such a resolution is inadequate for the 720×480 resolution of digital television. In addition, subtitle characters stored in the above discussed data formats may become distorted (e.g., "jagged") due to aliasing or other phenomena. One technique to prevent subtitle characters from becoming distorted during the encoding or decoding thereof is to utilize high resolution filters to convert the digital images into "multivalued" data, but such filters generally are extremely expensive and they cause deterioration in the background images of the picture.

Typically, bit map data which represents the subtitle characters undergo a "thickening" process wherein the edge of the characters are "outlined", but such a process generally causes the characters to "smear" in the horizontal direction. Thus, the resultant quality of subtitles represented by bit map data generally is poor.

OBJECTS OF THE INVENTION

Therefore it is an object of the present invention to provide apparatus and method for encoding and decoding digital video data which overcome the shortcomings of the above-discussed techniques.

Another object of the present invention is to provide apparatus and method for encoding and decoding digital video data having subtitle data therein and which are operable to remove noise from the subtitle data.

A further object of the present invention is to provide apparatus and method for encoding a digital video signal along with subtitle data which removes noise from the subtitle data before it is combined with the digital video signal.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method operate to receive subtitle data which represents a subtitle having a plurality of pixels, remove noise from the subtitle data in accordance with correlations between a respective pixel of the subtitle and pixels adjacent to the respective pixel, and encode digital video data along with the subtitle data having noise removed therefrom.

As one aspect of the present invention, the respective pixel is changed to a background level pixel when that pixel represents a noise pixel as by determining if the value of the pixel is less than the value of a background level pixel and the adjacent pixels represent background level pixels.

As another aspect of the present, pixels that are adjacent to and in vertical alignment with the respective pixel are utilized for determining whether to change the value of the respective pixel.

As a further aspect of the present invention, pixels that are adjacent to and in horizontal alignment with the respective pixel are utilized for determining whether to change the value of the respective pixel.

In accordance with another embodiment of the present invention, apparatus and method operate to receive digital video data that includes subtitle data which represents a subtitle having a plurality of pixels, extract the subtitle data from the received digital video data, remove noise from the extracted subtitle data in accordance with correlations between a respective pixel of the subtitle and pixels adjacent to the respective pixel, and superimpose the subtitle represented by the subtitle data having noise removed therefrom onto a video image represented by the digital video data.

In accordance with a further embodiment of the present invention, apparatus and method operate to receive subtitle data which contain noise, ascertain whether a respective pixel in the subtitle is a noise pixel, determine if pixels adjacent to the respective pixel in the subtitle are background level pixels, and change the subtitle data that represents the respective pixel to a background level when the respective pixel is ascertained to be a noise pixel and the adjacent pixels are determined to be background level pixels.

DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 5(*a*) and 5(*b*) are tables of addresses showing the contents of a table of contents (TOC);

FIGS. 6(*a*) and 6(*b*) are schematic diagrams of data streams of video, audio and subcode data stored on a record medium;

FIG. 7 is a table of various communications between system controllers 14 and 35;

FIG. 8 is a table of parameters for various communications of system controllers 14 and 35;

FIG. 10 is a color look-up table used during an encoding process of the present invention;

FIG. 13 is another color look-up table used by the encoding and decoding devices of the present invention;

FIGS. 22(*a*) and 22(*b*) schematically illustrate a subtitle character represented by character data with and without noise added thereto.

DETAILED DESCRIPTION OF CERTAIN PREFERRED EMBODIMENTS

Figure 1:
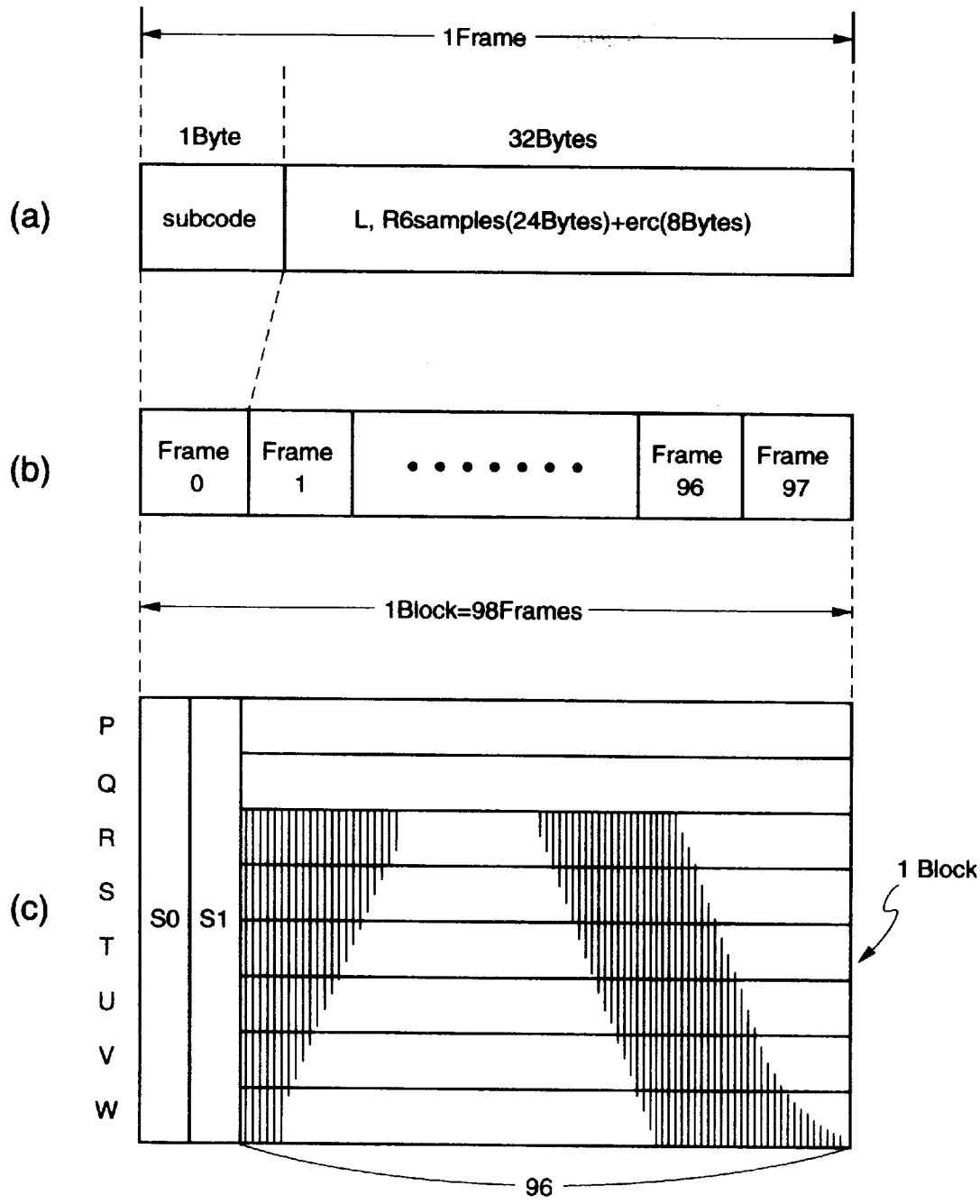
FIGS. 1(*a*) to 1(*c*) schematically illustrate the data structure of the CD-G data format.
Figure 2:
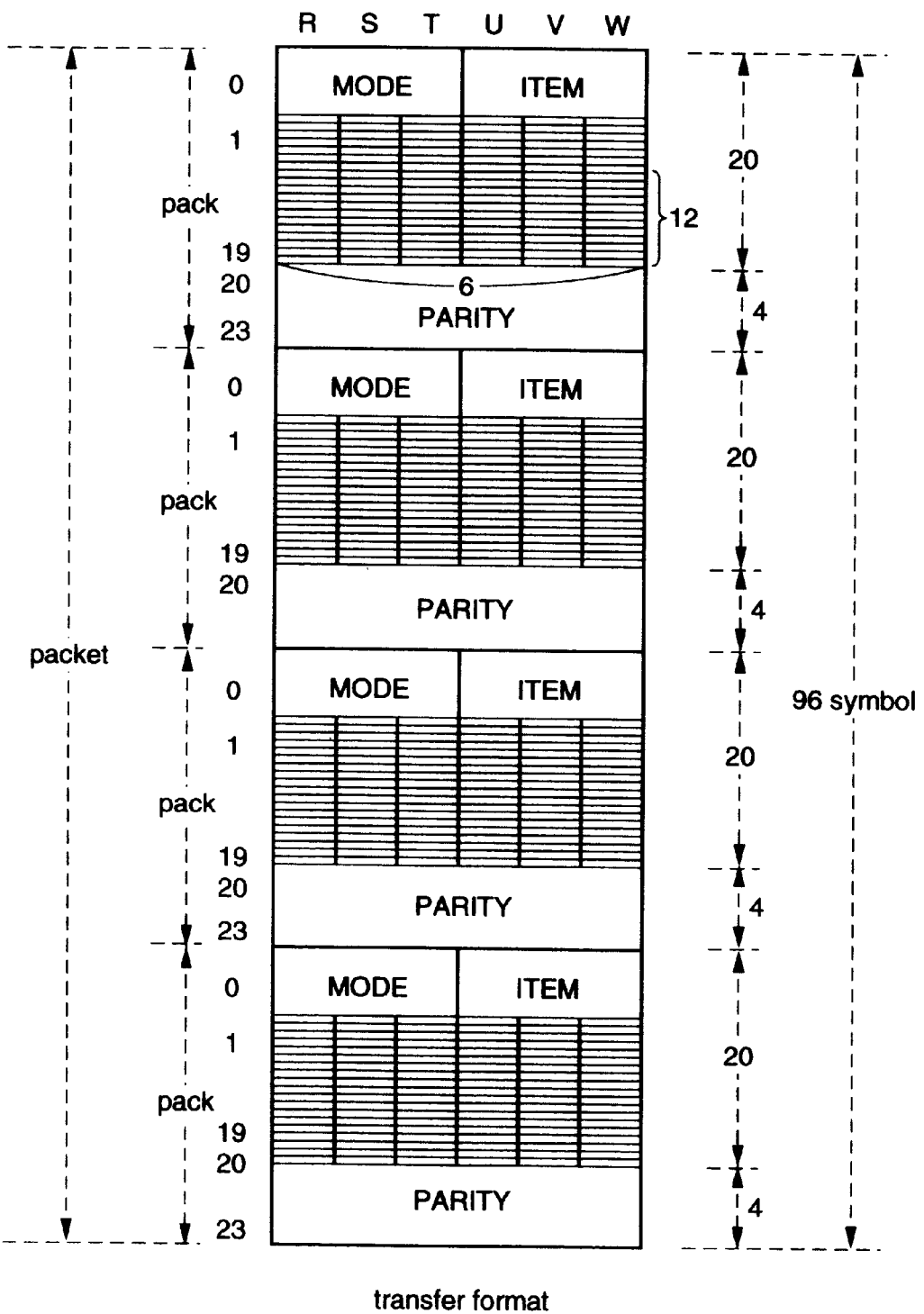
FIG. 2 schematically illustrates the transmission format of the data format shown in FIGS. 1(*a*) to 1(*c*)
Figure 3:
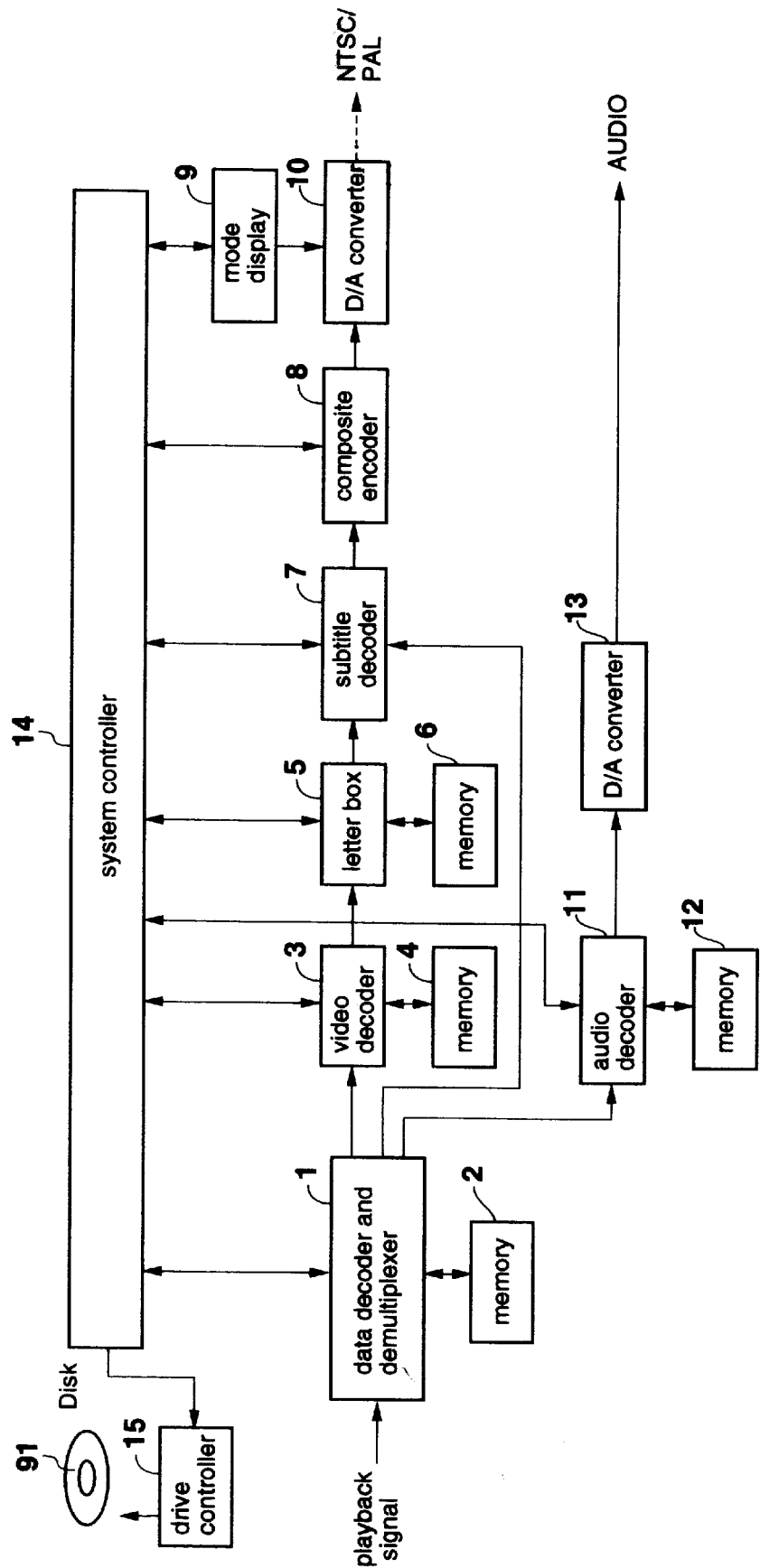
FIG. 3 is a block diagram of a data decoding device in accordance with the present invention.

Referring now to FIG. 3 of the drawings, a block diagram of a data decoding device in accordance with the present invention is shown. The data decoding device is comprised of a data decoder/demultiplexer 1, buffer memories 2, 4, 6 and 12, a video decoder 3, a letter box circuit 5, a subtitle decoder 7, a composite encoder 8, a mode display circuit 9, D/A converters 10 and 13, an audio converter 11, and a system controller 14. optionally, the data decoding device may include a drive controller 15 which stores subtitle data to or reproduces subtitle data from a record medium, for example, magneto optical disc 91.

A video signal having encoded video, audio and subtitle data therein is supplied to decoder/demultiplexer 1 (hereinafter demultiplexer 1) which decodes and corrects errors in the supplied signal, and which demultiplexes the video, subtitle and audio data therefrom and supplies the demultiplexed video, subtitle and audio data to video decoder 3, subtitle decoder 7 and audio decoder 11, respectively. Memory 2 is a buffer memory used by demultiplexer 1 in a manner well known in the art.

Video decoder 3 decodes the demultiplexed video data supplied thereto and supplies the decoded video data to letter box circuit 5 which, if necessary, operates to compress the video picture represented by the video signal by ¾ in the vertical direction so that the video picture can be displayed on a video monitor having a 4:3 aspect ratio. Letter box circuit 5 supplies the video data to subtitle decoder 7 (to be discussed).

Audio decoder 11 decodes the demultiplexed audio data supplied thereto in a manner well known in the art and supplies the decoded audio data to D/A converter 13 which converts the digital audio data to an analog audio signal for output. Buffer memories 4, 6 and 12 are utilized by video decoder 3, letter box circuit 5 and audio decoder 11, respectively, in a manner well known in the art.

Subtitle decoder 7 decodes the subtitle data supplied thereto in a manner to be discussed and superimposes the subtitle data on the video signal supplied from letter box circuit 5 and supplies the combined video and subtitle data to composite encoder 8. Composite encoder 8 converts the video signal having subtitle data superimposed thereon to either an NTSC, PAL or SECAM signal in a manner well known in the art and supplies the converted signal to D/A converter 10 which converts the digital video data to an analog signal for output.

The operations of each of the circuits of the decoder device of FIG. 3 discussed above are controlled by system controller 14, as well as by mode display circuit 9 which allows a user to provide instructions to the system controller 14 and which monitors and display the various operations.

Figure 4:
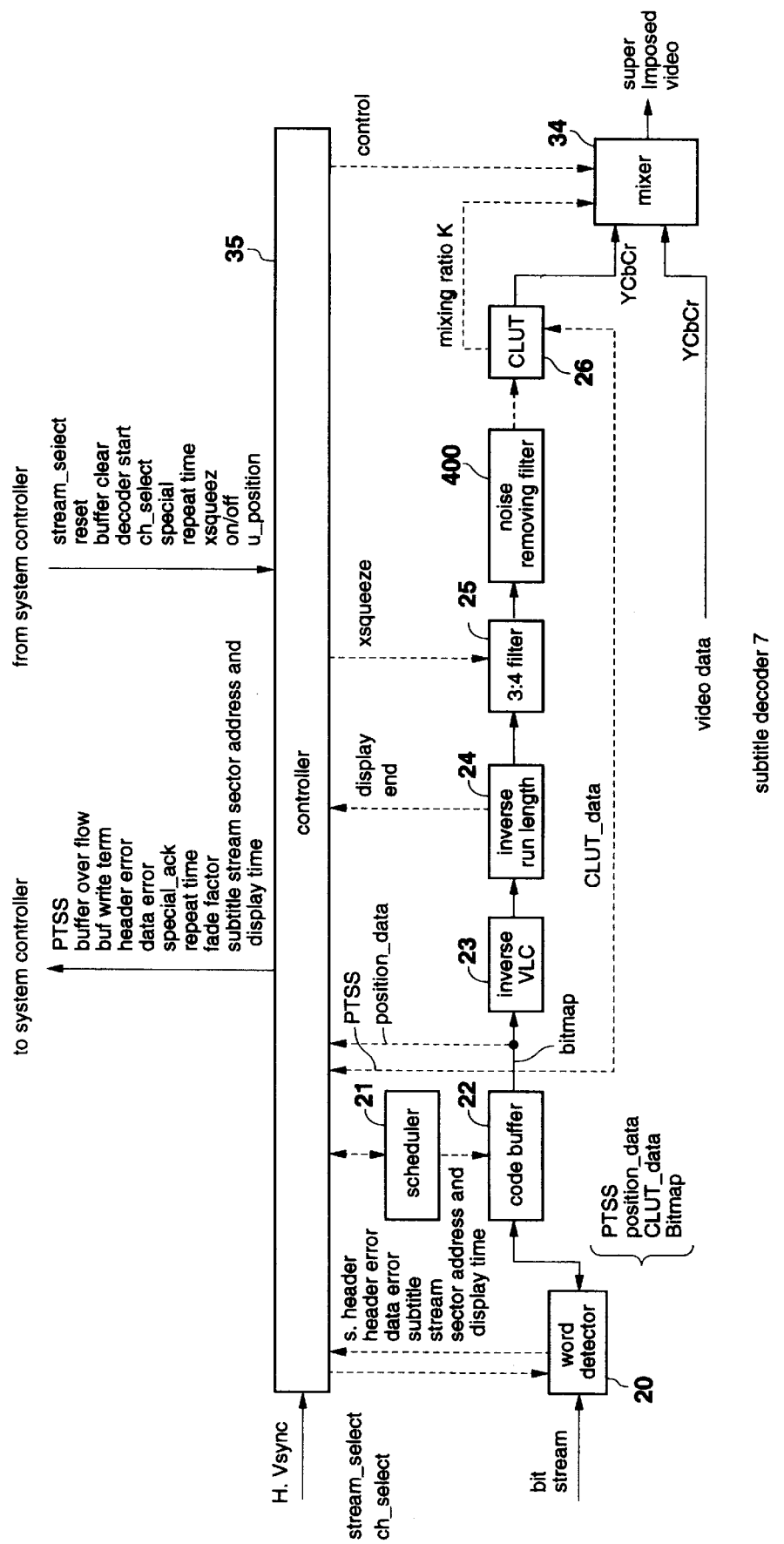
FIG. 4 is a block diagram of subtitle decoder 7 shown in FIG. 3.

Subtitle decoder 7 is shown in block diagram form in FIG. 4 and is comprised of a word detector circuit 20, a scheduler circuit 21, a code buffer 22, an inverse variable length coder (Inverse VLC) 23, an inverse run length circuit 24, a 3:4 filter 25, a color look-up table (CLUT) circuit 26, a mixer 34, a subtitle system controller 35, and a noise removing filter 400. As will be discussed, subtitle decoder 7 receives subtitle data in the form of a bit stream and decodes the bit stream at designated times after the storage thereof in code buffer 22. Subtitle data output from demultiplexer 1, shown in FIG. 3, is supplied to word detector 20 which detects the header information, the header error information and data error information (to be discussed) therein and supplies the detected information to system controller 35. Word detector 20 additionally detects and extracts from the supplied subtitle data time stamp (PTSS) data, which identifies when the subtitle is to be superimposed on the video signal, position data, which identifies where in the video image the subtitle is to be superimposed, pixel data, which represents the subtitle itself, and updated CLUT data. The extracted data is supplied to code buffer 22 which stores the data therein. Scheduler 21 controls the reading and writing operations of code buffer 22 and the read/write "access" bandwidth of code buffer 22 is determined from a memory access scheduling process that is controlled by the bit rate that the data is transmitted from demultiplexer 1, as well as by the display rate. For example, if the bit rate output of demultiplexer 1 is 20 Mbps (million bits per second), at a maximum, and code buffer 22 has an 8 bit I/O port, the preferred rate at which data is stored in code buffer 22 is 2.5 MHz. However, data is read from code buffer 22 in accordance with vertical and horizontal synchronization signals, position information stored in code buffer 22, and the receipt of a decode start signal from system controller 14. Data is read from code buffer 22 at the pixel sampling rate of 13.5 MHz, and since the write rate is 2.5 MHz, the slowest read rate is 3.375 MHz, which is ¼ of 13.5 MHz. In other words, one of every four clock periods at the 13.5 MHz clock rate is used for the writing operations and the remaining three clock periods of each four clock periods is utilized for reading data from code buffer 22. Since the I/O port of code buffer 22 is 8 bits wide, 3 clock periods×8 bits=24 bits that are read therefrom in each 4 clock cycles, and if each pixel of the subcode is comprised, at most, of six bits, real time display of a subtitle is possible.

As previously mentioned, word detector 20 supplies subtitle display time stamp (PTSS) data to system controller 35 which supplies the PTSS data to system controller 14. System controller 14 compares the time stamp data with the current time of a system clock (not shown) and when the time indicated by the time stamp is reached, system controller 14 supplies an appropriate instruction to system controller 35 in subtitle decoder 7 which, in response thereto, controls scheduler 21 and code buffer 22 to output subtitle data stored therein. In addition, in a normal playback mode, the subtitle data stored in code buffer 22 repeatedly is read therefrom so that the subtitle continuously is superimposed on each frame of the video picture until a subtitle display termination time is reached, such information being included with the subtitle display time stamp data. In a special play back mode, for example, in an "n" times fast forward or fast reverse mode, the subtitle data is read from code buffer 22 for a duration of 1/n the length of time it is read during normal playback mode. A pulse counter generally may be utilized in the normal and special playback modes to determine when reading of the subtitle date from code buffer 22 is to be terminated, wherein the pulse counter counts by 1 to a defined number (or decrements from the defined number to 0) in the normal playback mode and counts to the defined number by the rate n in the special playback mode.

Subtitle data read from code buffer 22 is supplied to inverse VLC circuit 23 which, if necessary, performs an inverse variable length coding operation on the read out data and supplies the decoded data to inverse run length circuit 24 which decodes the data by generating "level" data in a manner well known in the art and the decoded data (i.e. expanded data) is supplied to 3:4 filter 25. The expanded subtitle data is compressed in the horizontal direction in 3:4 filter 25 when the aspect ratio of a display is 4:3, such compression being formed in response to an xsqueeze command supplied from system controller 35. When the aspect ratio of a monitor is 16:9 or when the subtitle data represents a plurality of fonts, the subtitle data is not horizontally compressed.

As previously mentioned, system controller 14 supplies a decode start instruction to system controller 35 at an appropriate time, but the times at which decoding begins by the respective circuits of the subtitle decoder are delayed by predetermined amounts of time so as to compensate for any delay of the decoding of the video signal (without the subtitle data). Similarly, decoding of the video signal may be delayed by a predetermined amount of time so that the superimposition of the subtitle data on the video signal can be synchronized.

Filter 25 supplies the subtitle data to noise removing filter 400 which removes noise therefrom in accordance with the present invention, as will be further discussed below, and which supplies the subtitle data (with noise removed therefrom) to color look-up table (CLUT) circuit 26. As previously mentioned, word detector 20 extracts updated CLUT data from the subtitle data and supplies the CLUT data to code buffer 22 which stores the data therein. The CLUT data is read from code buffer 22 and supplied to CLUT circuit 26 which generates a suitable color therefrom for the subtitle data supplied from noise removing filter 400, and selects an address corresponding to the subtitle data for each pixel and provides a mixing ratio K and color components Y, $C_R$ and $C_B$ to mixer 34. Mixer 34, in response to an appropriate superimpose control signal from controller 35, "mixes" color data Y, $C_R$ and $C_B$ supplied from CLUT circuit 26 with the video data at an appropriate location thereof (as determined by the subtitle position data) in accordance with mixing ratio K. In addition, when a fade coefficient is specified in the mode information, previously discussed, fade-in and fade-out of the subtitle from the video picture is accomplished. When the subtitle is not to be superimposed on the video signal, as identified by the superimpose control signal from controller 35, mixer 34 supplies as an output only the video data supplied thereto.

When a subtitle generator (shown as character generator 55 in FIG. 11) generates and supplies a subtitle in the form of bitmap data to be superimposed on a video signal, such data generally is transmitted in the form of an analog signal via an appropriate analog system to a subtitle encoder which encodes the subtitle data prior to its being superimposed on a video signal. Due to the various frequency characteristics and bandwidth function of such an analog system, there results an "overshooting" and/or "undershooting" of rises and falls in the bitmap data which causes the bitmap data to "smear" in the horizontal direction. FIG. 20(A) illustrates bitmap data which has been "smeared" and which, as identified herein, represents subtitle data having "noise" added thereto. FIG. 20(B) illustrates non-smeared bitmap data and which represents subtitle data with the noise removed therefrom. Noise removing filter 400 of the subtitle decoder of the present invention removes the "noise" (i.e., removes the smear) from the subtitle data (to be further discussed) and supplies the subtitle data with noise removed therefrom to CLUT circuit 26.

The manner in which subtitles are retrieved from a record medium (e.g., digital video disk) will now be explained with reference to FIGS. 5(A) and 5(B) of the drawings. Unlike the above-discussed data format in which video, audio and subcode data are multiplexed into a single video signal and then supplied to demultiplexer 1, subtitle data may be stored separately from the video and audio data, or all of the video, audio and subtitle data may be stored on a record medium, e.g., a digital video disk, wherein the decoding apparatus of the present invention retrieves from disk 91, the subtitle data stored thereon as needed. As shown in FIG. 5(A), a table of contents (TOC), which generally is stored on the innermost periphery (known as the "lead-in") of disk 91, includes for each subcode frame number (N, N+1, etc.), a one byte pointer value (POINT) which identifies the location of the frame and a timecode (PMIN, PSEC, PFRAME) corresponding to the time of the frame. The table of contents shown in FIG. 5(B) identifies the type of data included in the data stream (i.e., video, audio or subtitle data), the frame number of the respective data stream, as well as the start and end addresses (START_SECTOR_ADDRESS and END_SECTOR_ADDRESS) of the disk at which the respective data stream is stored. System controller 14, shown in FIG. 3, retrieves the TOC data from disk 91 by means of drive controller 15 so as to identify the locations of selected data streams.

In addition, a stream "map", which is recorded at various locations on the disk, identifies the stream access points so as to provide another means for retrieving subtitles from the record medium. The stream map is provided as a packet of data and identifies the locations of the video, audio and subtitle data, and the locations of the various blanking information, as well as identifying the packet lengths of each of the data stream, the length of the stream maps, etc. System controller 14 retrieves a particular stream map in a manner similar to that of the TOC data.

Another method of retrieving a subtitle from a digital video disk is by utilizing subtitle stream sector address data that is stored with each subtitle (identified herein as the "current subtitle") and which includes data pertaining to a previous subtitle, that is, the subtitle that is superimposed prior to the subtitle in which the sector address data is included (identified herein as "previous subtitle") and which also includes data pertaining to a subtitle that follows the current subtitle, that is, the next subtitle (identified herein as "successive subtitle") to be superimposed on the video image after the superimposition of the current subtitle. Table 2, shown below, illustrates the data structure of the subtitle stream sector address data.

TABLE 2

| Data ID | No. of bits | Mnemonic |
|---|---|---|
| user_data_flag | 1 | uimsbf |
| 9f (user_data_flag="1") [ | | |
| length_of_user_data | 16 | bslbf |
| next_subtitle_address_offset | 24 | bslbf |
| reserved | 8 | bslbf |
| previous_subtitle_address_offset | 24 | bslbf |
| reserved ] | 8 | bslbf |

Subtitle decoder 7 decodes the subtitle stream sector address data and supplies the decoded data via subtitle system controller 35 to system controller 14 which retrieves from disk 91 the subtitle data recorded thereon that corresponds to the desired subtitle.

FIG. 6(A) illustrates the positions in the data stream at which subtitle data are located. As shown, the subtitle stream sector address data included in each set of subtitle data "points" to the locations in the data stream at which "previous" and "successive" subtitles are located. Further, FIG. 6(A) illustrates a "normal mode" stream which is retrieved in a normal playback mode of a reproducing device wherein each subtitle page is stored as partial or "divided" pages Sp at a plurality of locations in the data stream on the video disk. FIG. 6(B) illustrates a "trick mode" stream retrieved in a special playback mode (e.g., fast-forward) of the reproducing device wherein the data stored immediately prior to a subtitle page represents an intraframe coded video image (V_I) (i.e., an "I" picture). Each entire or "whole" subtitle page Sw in the data stream is preceded by an "I" picture so that a video image along with a subtitle can be reproduced in a special playback mode (e.g., a fast-forward or fast-reverse mode). In both FIGS. 6(A) and 6(B), V_P represents a predictive coded image (a "P" picture), V_B represents a bi-directional predictive coded image (a "B" picture), and "A" represents a packet of audio data.

FIG. 7 is a table of various communications between system controller 14 of the decoding device and system controller 35 of the subtitle decoder, and FIG. 8 is a table showing the number of bits for each type of data transmitted to system controller 35 from system control 14. Since the precise communications between system controllers 14 and 35 form no part of the present invention, further description thereof is omitted herein.

Figure 9:
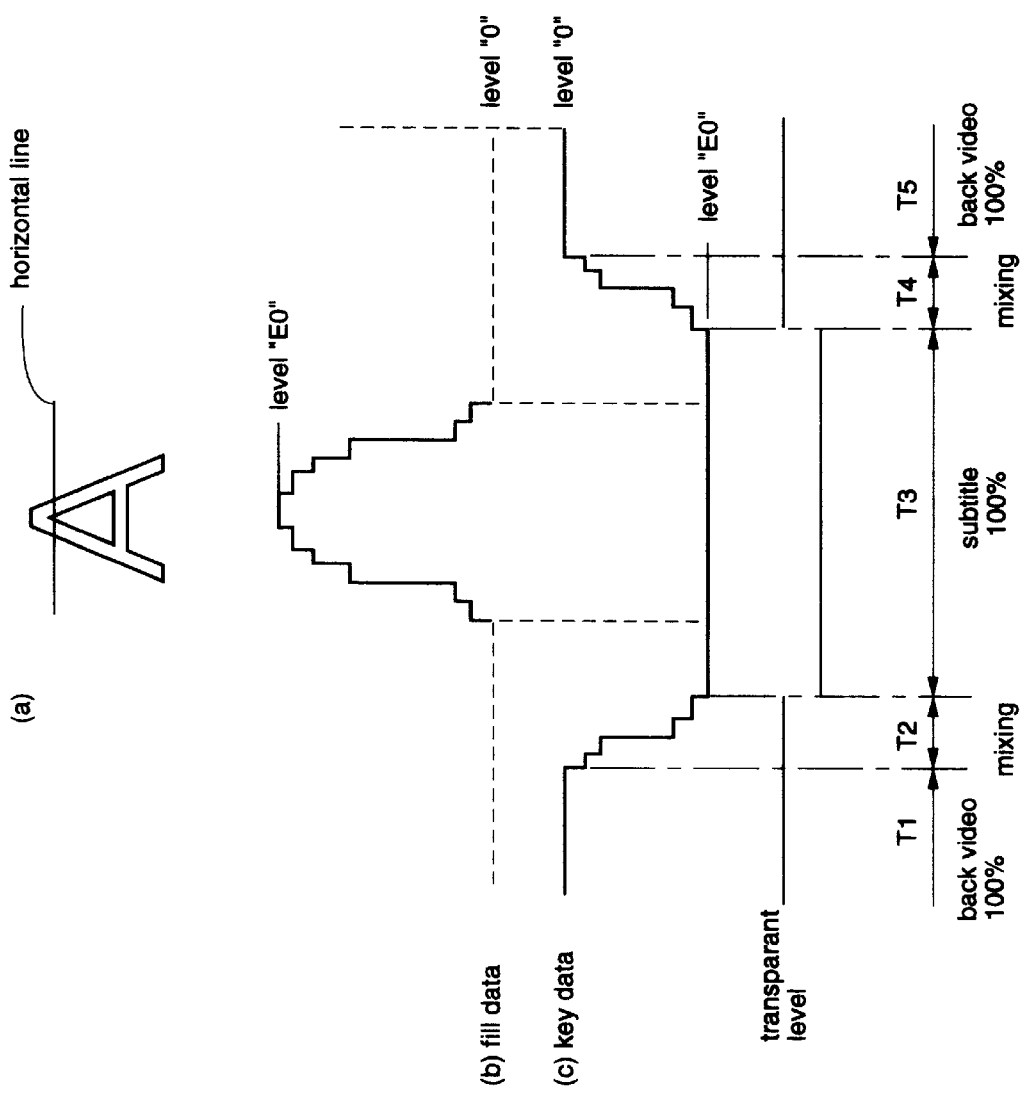
FIGS. 9(*a*) to 9(*c*) are signal waveforms of subtitle data in accordance with the present invention.

The method in which subtitle data is coded using the four-bit encoding method will now be described with reference to FIGS. 9(a) to 9(c). FIG. 9(a) schematically illustrates the character "A" that is to be superimposed on a video image and FIGS. 9(b) and 9(c) illustrate the subtitle data signal levels of fill data and key data, respectively, corresponding to the horizontal line shown in FIG. 9(a). The fill data corresponds to the luminance level (Y) of pixels of the subtitle and, as shown in FIG. 9(b), the fill data is at the lowest level "0h" (hexadecimal format) during the time periods T1, T2, T4 and T5, and is at a level above the lowest level only in a period T3. The key data represents the mixing ratio K and generally corresponds to the degree to which the fill data is mixed with the video image and, as shown in FIG. 9(c), the key data is at the level "0h" during periods T1 and T5 so that only the video image (also called herein as "background image") is provided, is at an intermediary level between "0h" and "E0h" during periods T2 and T4 so as to mix in various degrees the subtitle with the background image, and is at the level "E0h" during period T3 so that only the subtitle represented by the fill data is provided.

Since the background image adjacent to the subtitle image partially is "muted", and the background image "behind" the subtitle image fully is "muted", the subtitle image is fully and clearly visible in the video picture.

FIG. 10 is a color look-up table (CLUT) included in CLUT circuit 26 shown in FIG. 4 which is utilized when the subtitle is mixed with (i.e., superimposed on) the background image. The table is shown as including addresses 0 to F (hexadecimal) each having respective luminance (Y) and chrominance ($C_r$ and $C_b$) values and key data K, wherein only the subtitle is displayed (without any background image mixed therewith) for addresses with a luminance level of 0 and a key value K of E0h.

Figure 11:
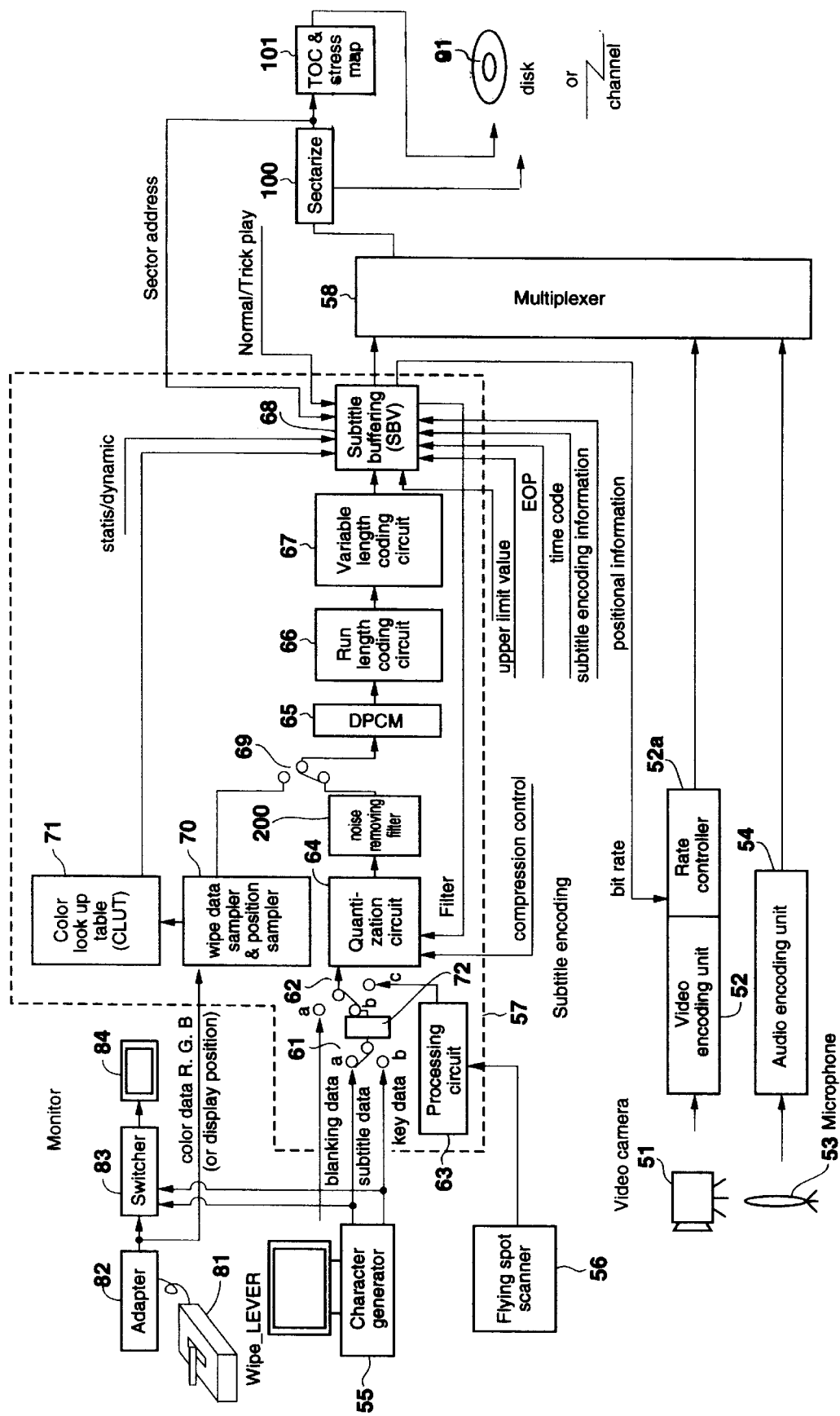
FIG. 11 is a block diagram of the data encoding device in accordance with the present invention.

Referring next to FIG. 11 of the drawings, a block diagram of a data encoding device which includes the noise removing filter of the present invention is shown. A video camera 51 produces therein and supplies an analog video signal to a video encoding unit 52 which converts the analog video signal to digital video data, compresses the digital video data and supplies the compressed data in units of packets to a multiplexer 58. Alternatively, the video signal may be reproduced from a record medium and supplied to video encoding unit 52. Video encoding unit 52 includes a rate controller 52a which, in response to a bit rate signal supplied from a subtitle buffer verifier (SBV) 68 (to be discussed), controls the degree of compression of the video data depending on the amount of subtitle data to be included therewith.

A microphone 53 supplies an analog audio signal to an audio encoding unit 54 which converts the analog audio signal to digital audio data, compresses the digital audio data and supplies the compressed digital audio data in units of packets to multiplexer 58. Alternatively, an audio signal may be reproduced from a record medium and supplied to audio encoding unit 54.

A character generator 55 produces subtitle data in the form of digital bitmap data and supplies the digital bitmap data to a subtitle encoding unit 57. Alternatively, a flying spot scanner 56 provides subtitle data in the form of an analog bitmap signal to subtitle encoding unit 57. Subtitle encoding unit 57 is comprised of switches 61, 62 and 69, processing circuit 63, digital filter 72, quantization circuit 64, wipe data sampler & position sampler circuit 70, color look-up table circuit 71, differential PCM encoder (DPCM) circuit 65, run length coding circuit 66, variable length coding circuit 67, subtitle buffer verifier (SBV) circuit 68 and noise removing filter 200.

Character generator 55 supplies to a terminal "a" of switch 61 subtitle data (i.e., fill data) and supplies to a terminal "b" of switch 61 key data. In addition, character generator 55 also supplies to a terminal "a" of switch 62 blanking data. The subtitle data and key data are time-divisionally multiplexed via switch 61 and supplied to digital filter 72 which filters the subtitle and key data in a manner well known in the art and which supplies the filtered data to a terminal "b" of switch 62. If flying spot scanner 56 provides subtitle data, the data is supplied to a terminal "c", of switch 62 after being converted to a digital signal and processed in a known manner in processing circuit 63.

Switch 62 supplies the subtitle data supplied from either the character generator or the scanner to quantization circuit 64 which quantizes the subtitle data using the data stored in the color look-up table in circuit 71 and which supplies quantized subtitle data to noise removing filter 200. Noise is removed from the subtitle data in a manner to be discussed in filter 200 before it is supplied via switch 69 to DPCM circuit 65 which differential PCM encodes the subtitle data and which supplies the encoded subtitle data to run length coding circuit 66 and then to variable length coding circuit 67 which compress the subtitle data in manners well known in the art.

Color wipe data which is in the form of RGB data or position data, and which is utilized to provide, for example, scrolling subtitles (e.g., for karaoke), is generated in a color wipe generator (not shown) and supplied via a wipe lever 81 to adapter 82 which supplies the color wipe data to both switcher 83 and wipe data sampler 70. Switcher 83 receives subtitle data from character generator 55 and "overlays" the subtitle data with the color wipe data supplied thereto and supplies the combined subtitle data to a monitor 84 so that the resultant subtitle may be viewed.

Figure 12:
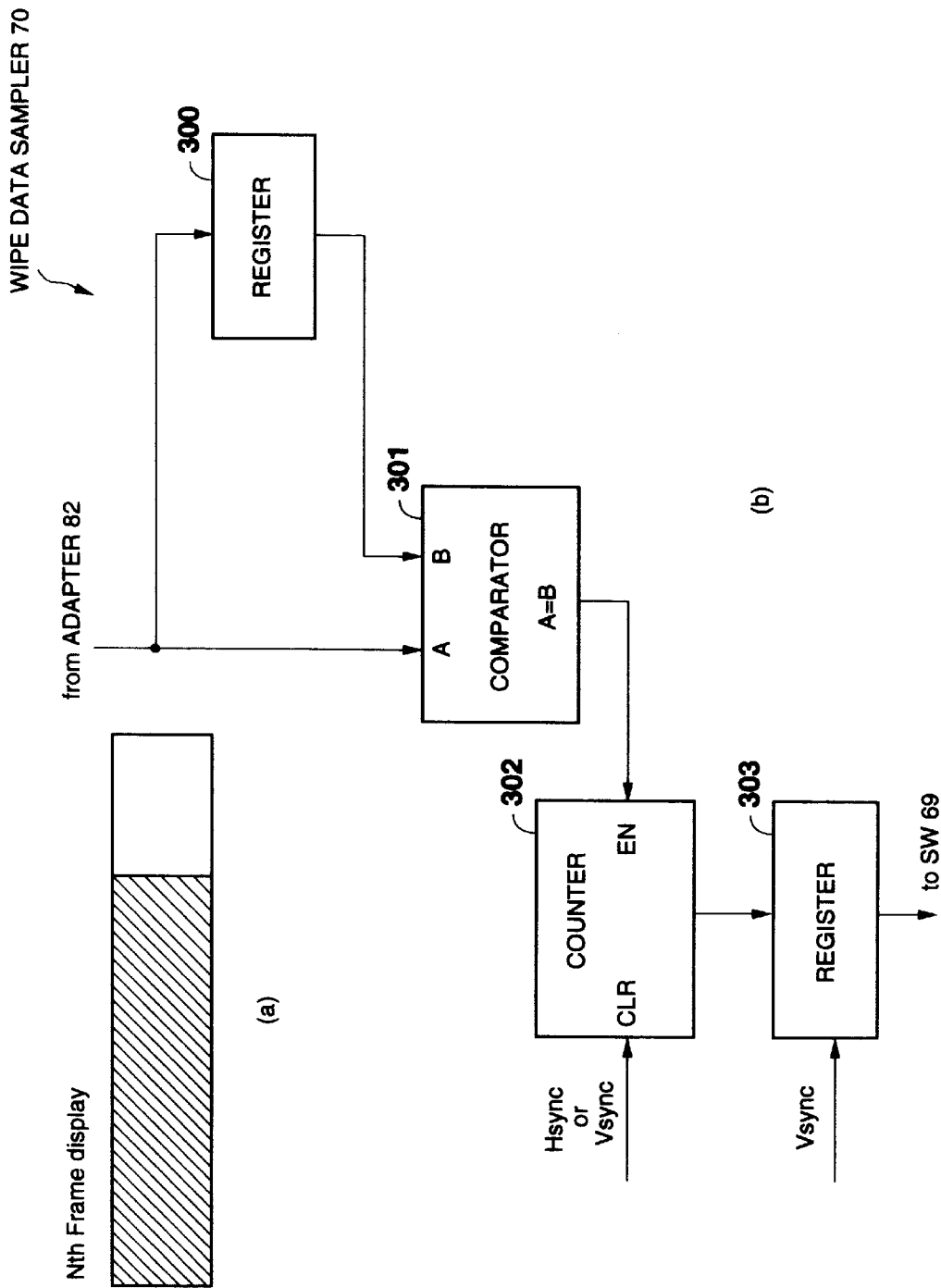
FIGS. 12(*a*) and 12(*b*) schematically illustrate wipe data sampler 70 shown in FIG. 11.

FIG. 12(a) schematically illustrates the display of a frame of the resultant subtitle and FIG. 12(b) is a block diagram of wipe data sampler 70. As shown, adapter 82 supplies the RGB color data to both register 300 and comparator 301 of circuit 70. Register 300 latches the value of each pixel included in the supplied signal and supplies the latched value to comparator 301 which operates to compare the value of a supplied pixel (from adapter 82) and the value of a previously supplied pixel (from register 300) and which controls a counter 302 to increment the count therein by one each time the compared values are equal. In other words, comparator 301 outputs a "true" condition when each of the pixels are generated from the same color look-up table, and outputs a "false" condition at the pixel when the color look-up table changes. The count value thus is equal to the number of matches between the present and previous values, which is the same as the position at which the color look-up table changes. The count in counter 302 is reset at each occurrence of the horizontal or vertical synchronization signals and is latched in register 303 at each vertical synchronization signal. Register 303 supplies the latched count value via switch 69 to DPCM circuit 65 and then to circuits 67 and 68 which compress and supply the count data in the form of a packet to multiplexer 58.

Subtitle color wipe information or subtitle position information is encoded in units of frames, but it also possible to encode a plurality of frames together as a single unit. Subtitle buffer 68 controls the quantization level of quantization circuit 64 so that buffer 68 does not overflow due to the large amount of encoded subtitle data supplied thereto.

FIG. 13 is a color look-up table (CLUT) similar to the color look-up table shown in FIG. 10 and which is included in color look-up table (CLUT) circuit 71. As shown, each address 0 to F (hexadecimal) has respective luminance (Y), chrominance ($C_r$ and $C_b$) and key data K values. The luminance values Y correspond to the fill data and the key data K correspond to the mixing ratios. CLUT circuit 71 supplies the values of the color look-up table to subtitle buffer 68 so that the table is stored with the subtitle data. The CLUT data is reproduced in a decoding device so as to establish the CLUT values therein, as previously discussed. The color look-up table values may be modified as necessary for different subtitles.

Subtitle buffer 68 (or subtitle buffer verifier) receives sector address data, normal/trick play data, position data, etc., and combines the supplied data to the compressed and encoded subtitle data that is supplied thereto and supplies the resultant subtitle data to multiplexer 58. Subtitle buffer 68 controls the bit rate of its input to prevent either the underflow or overflow of data therein by controlling the quantization level of quantization circuit 64.

Multiplexer 58 multiplexes, e.g., time-divisionally multiplexes, the video data supplied from video encoding unit 52, the audio data supplied from audio encoding unit 54 and the subtitle data supplied from subtitle buffer 68, performs error correction on the multiplexed data, and modulates (e.g., eight to fourteen modulation) the multiplexed data. Multiplexer 58 outputs the multiplexed data as a data stream to a sectarize processor 100 which generates from the supplied data stream fixed length sectors each comprising of either one or more than one packet of data and which supplies each sector of data for output either to be recorded on a disk 91 or to be transmitted over a transmission channel. Sectarize processor 100 supplies each sector of data also to a table of contents (TOC) and stream map generator 101 which generates the table of contents and the stream map, previously discussed, from the sector data supplied thereto and which supplies the table of contents and stream map data as an output to be recorded on disk 91.

Figure 14:
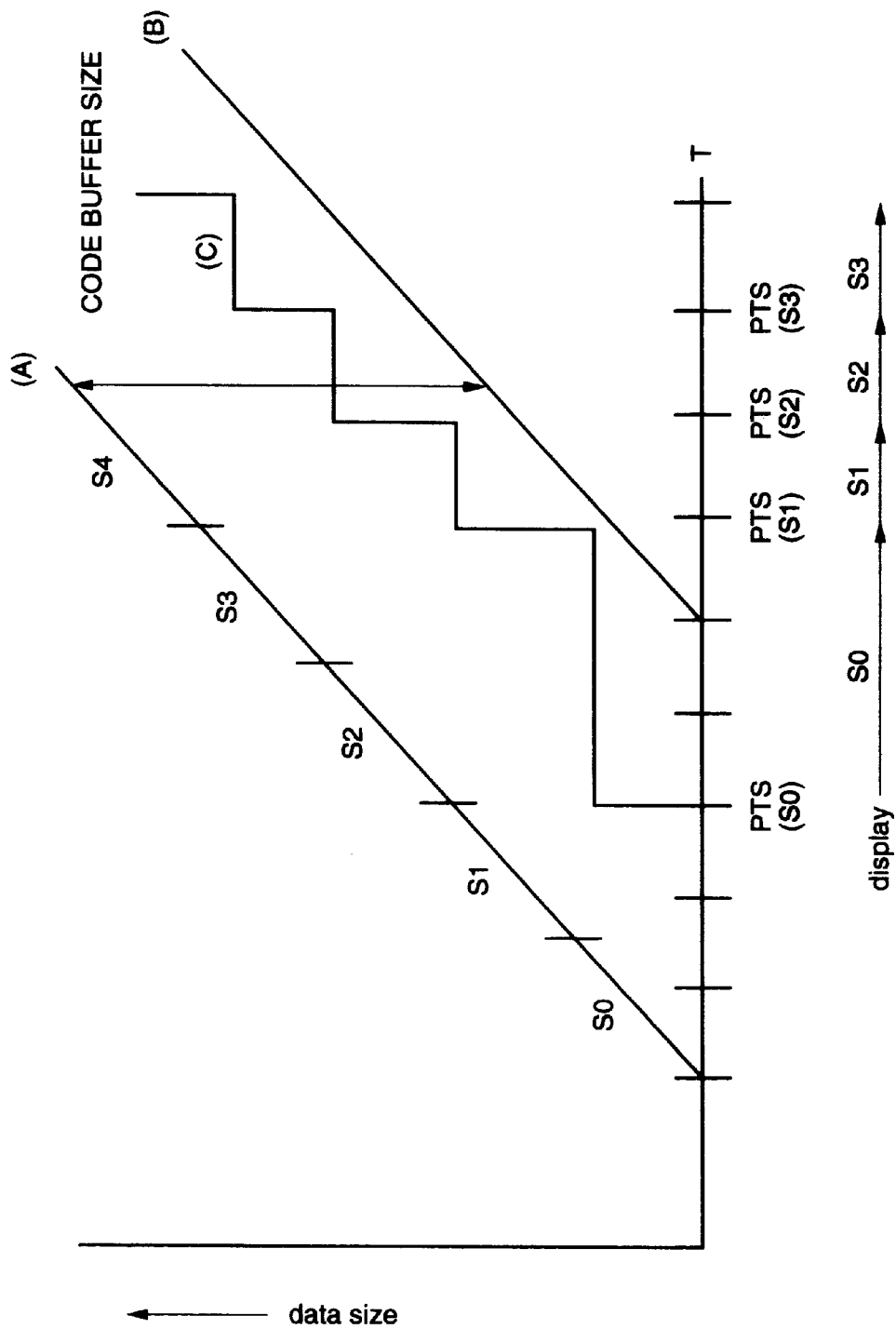
FIG. 14 schematically illustrates the contents of the code buffer of the subtitle decoder of the present invention.

Referring next to FIG. 14 of the drawings, the operation of subtitle buffer 68 shown in FIG. 11 will be described, wherein the vertical axis represents an amount of data, the horizontal axis represents time, the size (i.e., data capacity) of the buffer is represented by the vertical distance between diagonal lines A and B, and the read/write bit rate of the buffer is represented by the slope of diagonal lines A and B. "Stepped" line C represents the amount of data stored in the code buffer that has yet to be transmitted and it is necessary to prevent line C from crossing line A, which would result in an underflow condition, and to prevent line C from crossing line B, which would result in an overflow condition. Several pages of data S0, S1, S2 and S3 successively are stored in the code buffer and are output from the code buffer beginning at the display times indicated. Horizontal portions of line C represent times at which data is stored in the code buffer and vertical portions of line C represent times at which data is retrieved from the code buffer. Although the slopes of diagonal lines A and B are shown as being constant in FIG. 14, a variable bit rate (i.e., variable slope(s)) is also contemplated.

Figure 15:
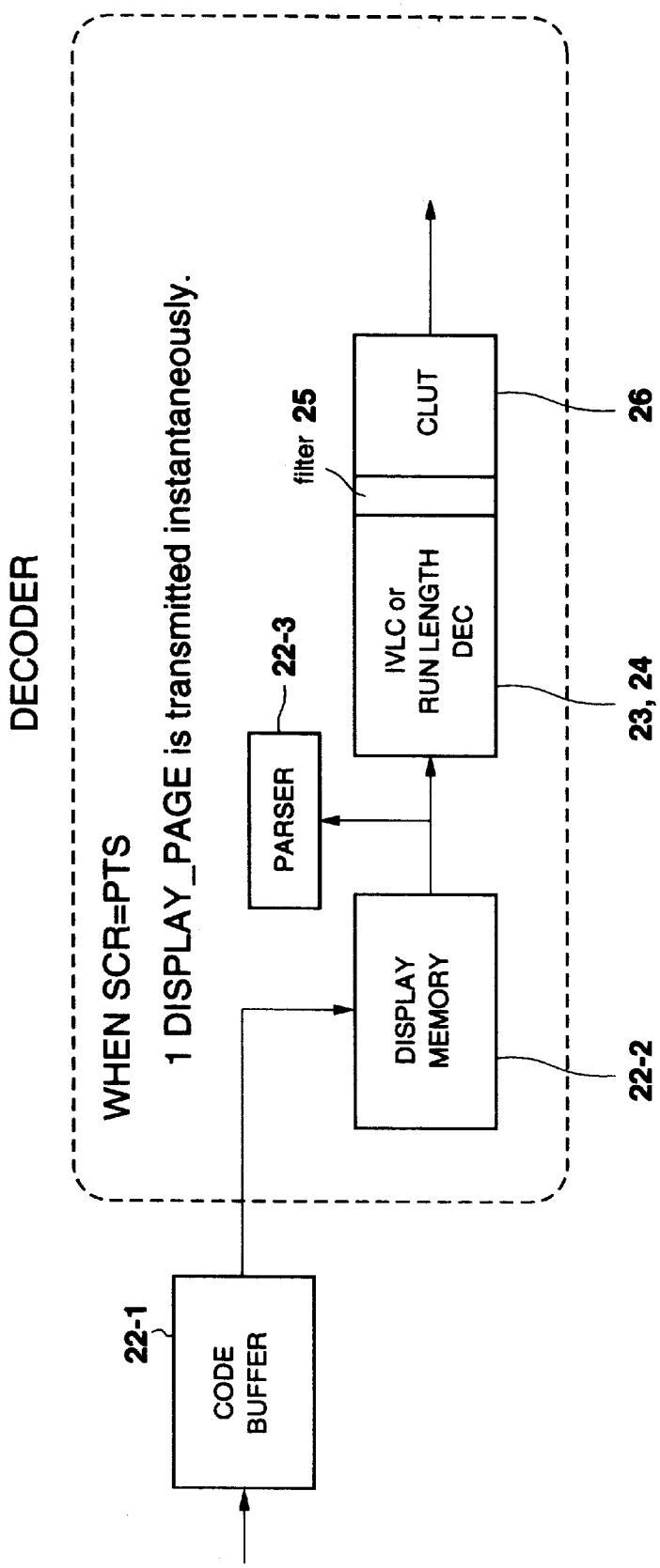
FIG. 15 is a block diagram of the subtitle decoder buffer of the present invention.

Referring back to code buffer 22 included in the subtitle decoder shown in FIG. 4, code buffer 22 operates in a manner similar to that discussed above with respect to subtitle buffer 68 and with reference to FIG. 14. FIG. 15 is a block diagram of code buffer 22 which is shown as being comprised of a code buffer 22-1, a display memory 22-2 and a parser 22-3. The bit stream supplied to code buffer 22 is supplied to and stored in code buffer 22-1 which transfers one page of subtitle data therein to display memory 22-2 when the system clock coincides in time with the display time PTSS data. Parser 22-3 separates the header data from the remaining subtitle data. Circuits 23–26 shown in FIG. 15 previously have been discussed with reference to FIG. 4.

Figure 16:
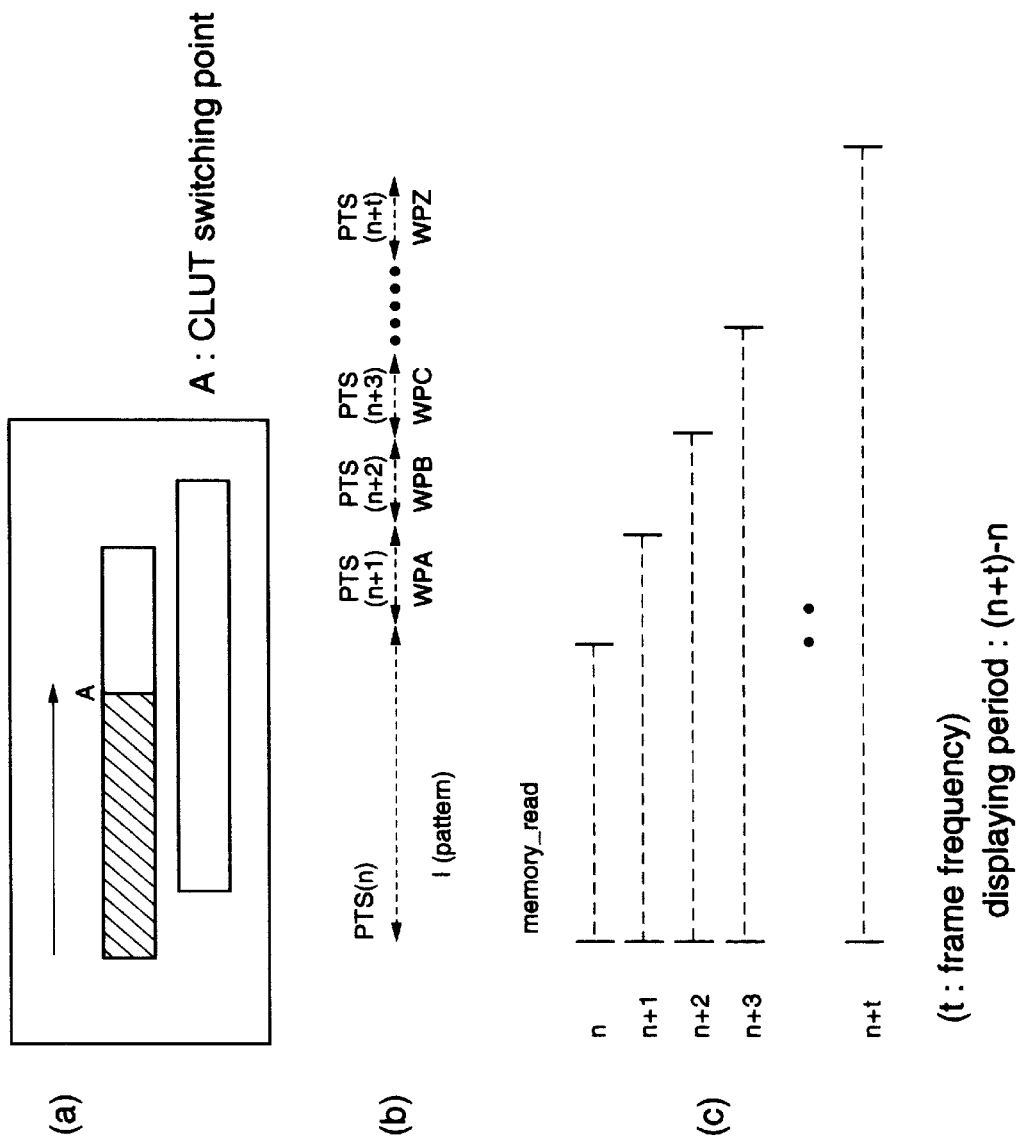
FIGS. 16(*a*) to 16(*c*) schematically illustrate the color wipe operation.
Figure 17:
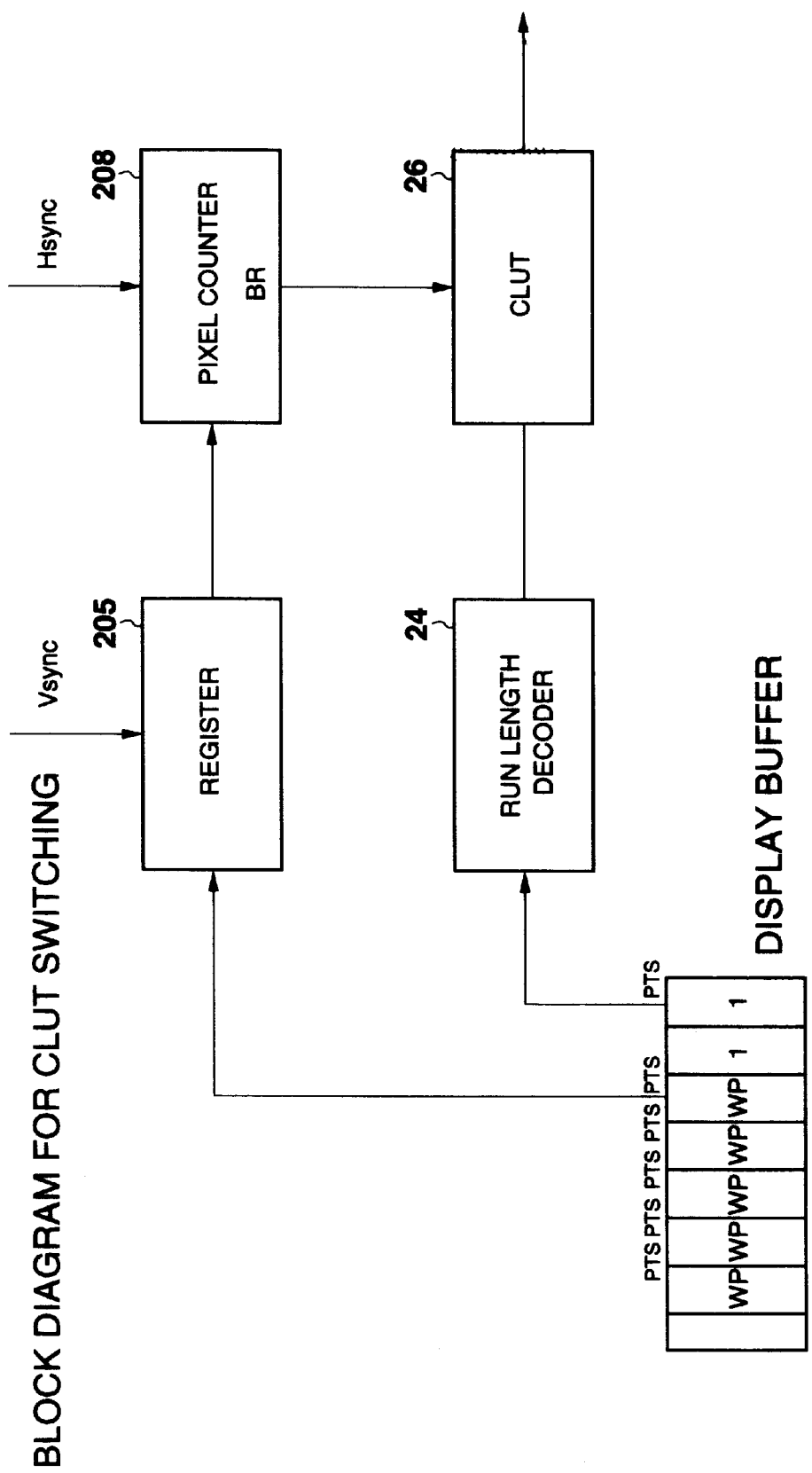
FIG. 17 is a block diagram of the color look-up table circuit.

The operation of CLUT circuit 26 when color wipe data is included with the subtitle data in the bit stream will now be described with reference to FIGS. 16 to 19. Referring first to FIGS. 16(*a*) to 16(*c*), FIG. 16(*a*) illustrates the position A at which the color look-up table is switched from a first color look-up table to a different color look-up table. Subtitle pattern data and wipe data (WPA, WPB, etc.) for each subtitle (n, n+1, n+2, etc.) shown in FIG. 16(*b*) to be displayed are stored in code buffer 22, wherein the amount of data for each subtitle is illustrated in FIG. 16(*c*) and wherein each PTS in FIG. 16(*b*) represents a time "stamp" indicative of the time at which the respective subtitle is to be displayed. When the time indicated by the time stamp PTS of the first subtitle n is reached, the subtitle data for subtitle n is read from the code buffer, decoded and displayed (i.e., superimposed on the video image). When the time indicated by the time stamp PTS of the next subtitle n+1 is reached, wipe data WPA is read from code buffer 22 during the vertical blanking interval of frame n+1 and latched in register 205, shown in FIG. 17, at the receipt of the vertical synchronization signal. Register 205 supplies the latched wipe data WPA to a pixel counter 208 so as to cause the values in the CLUT table in CLUT circuit 26 to be modified. The wipe data provides, for example, for the switching of the table data in the upper addresses and the lower addresses therein to provide the "upper" data in the lower portion of the table and to provide the "lower" data in the upper portion of the table.

Wipe data that is supplied from register 205 to pixel counter 208 is stored therein, at which time, a counter therein is decremented at each occurrence of the horizontal synchronization signal. A similar process is carried out for each line at the time of the "horizontal wipe". When the pixel counter equals zero, a borrow flag therein is set and is supplied to CLUT circuit 26 which carries out the wipe operation in response thereto.

Subtitle pattern data, unlike the wipe data, is read from code buffer 22 and supplied to inverse VLC circuit 23 during an active period of the video signal and subsequently is supplied via circuits 24, 25 and 400 to CLUT circuit 26, as previously discussed.

Referring back to FIG. 13, the color look-up table shown incorporates two sets of colors, one set for addresses 0h to 7h and a second set for addresses 8h to Fh. Thus, the wipe color is changed by changing the most significant bit (MSB) of the CLUT address. The borrow flag BR output from pixel counter 208, shown in FIG. 17, may be supplied as the MSB of the CLUT address, which reduces the number of bits to be encoded to 3 when each pixel is represented by 4 bits, and which reduces the number of bits to be encoded to 1 when each pixel is represented by 2 bits. Alternatively, using a 4 bits per 2 pixel format, only the MSB is employed for color control and the remaining three bits are used as pixel information.

Figure 18:
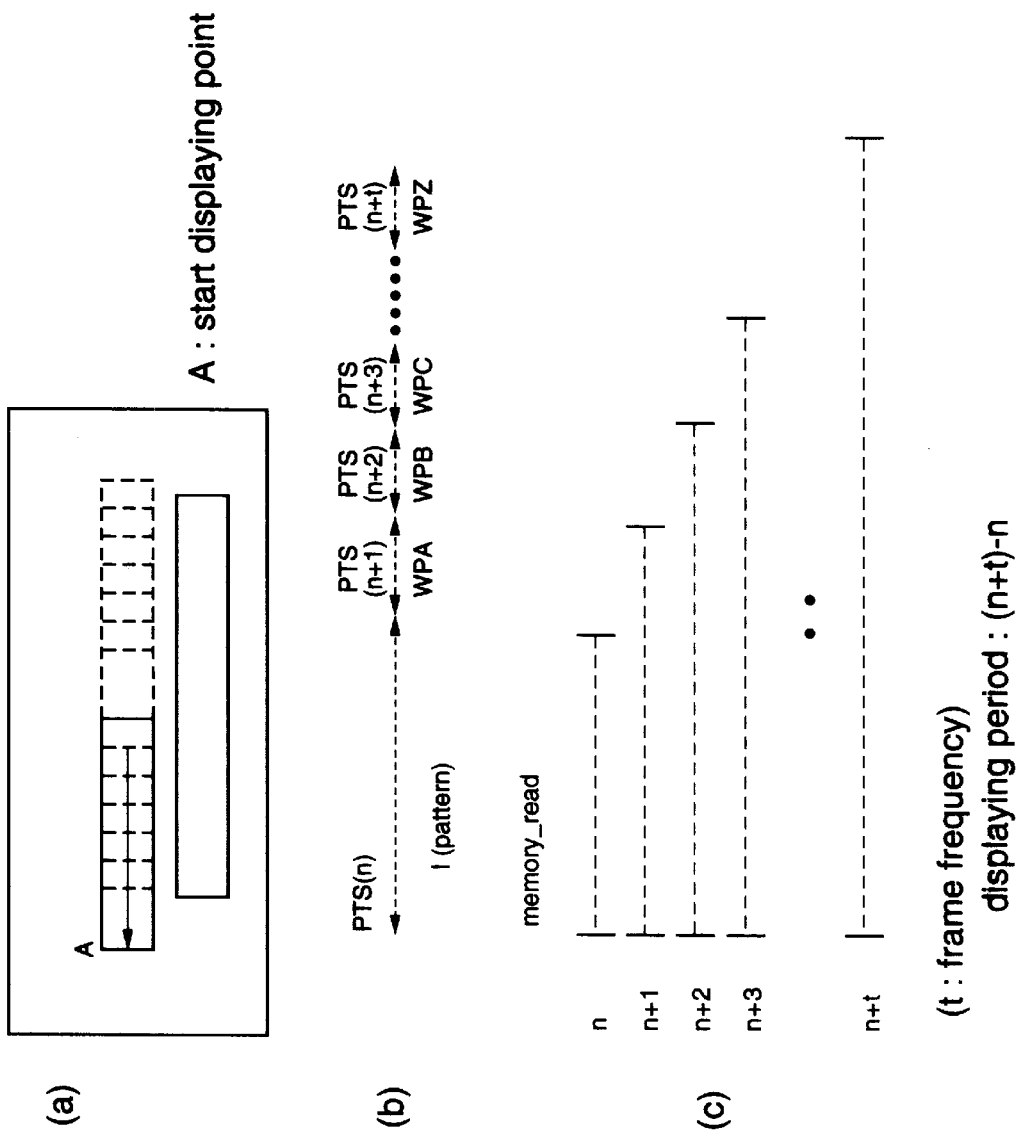
FIGS. 18(*a*) to 18(*c*) schematically illustrate the display position changing operation.
Figure 19:
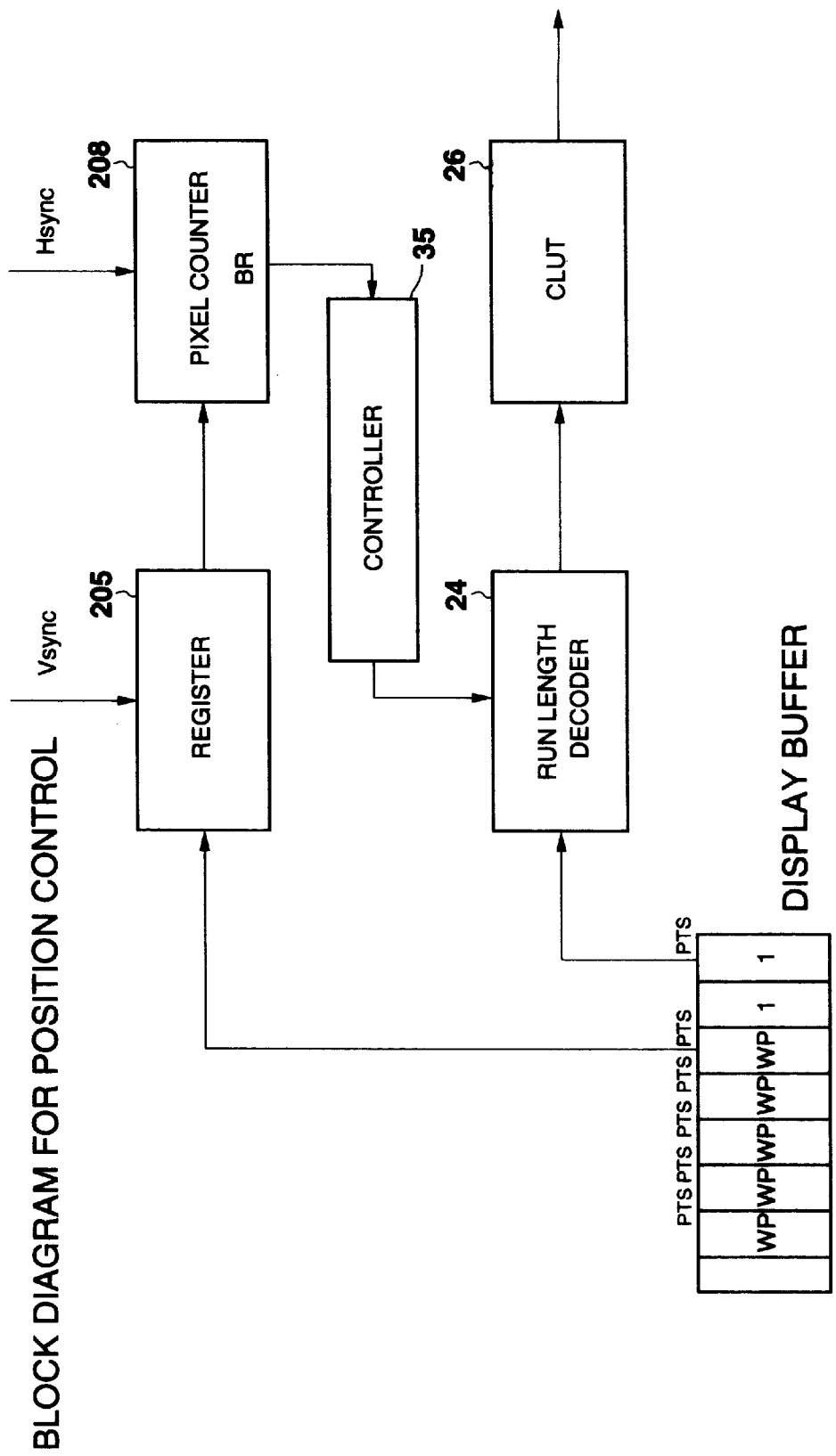
FIG. 19 is a block diagram of a position control circuit.

The operation of shifting the position of subtitles will now be described with reference to FIGS. 18(*a*) to 18(*c*) and 19. Position data which represents the position of a subtitle along the horizontal axis of an image, such as shown in FIG. 18(*a*), is supplied to the subtitle decoder along with the subtitle data during an appropriate frame, such as shown in FIG. 18(*c*). FIG. 18(*b*), similar to FIG. 16(*b*), illustrates the presentation time stamps PTS and subtitle data, including wipe data WPA, WPB, etc., of each of the subtitles. The position data is read from code buffer 22 and latched in register 205, shown in FIG. 19, at each vertical synchronization signal and the latched position data is supplied to pixel counter 208 which stores the position therein and which decrements the stored position at each horizontal synchronization signal. When the stored position equals zero, the borrow flag BR is set and system controller 35 (FIG. 4), in response to the setting of the borrow flag, controls code buffer 22, along with run length decoder 24, to begin reading out and decoding the subtitle.

Figure 20:
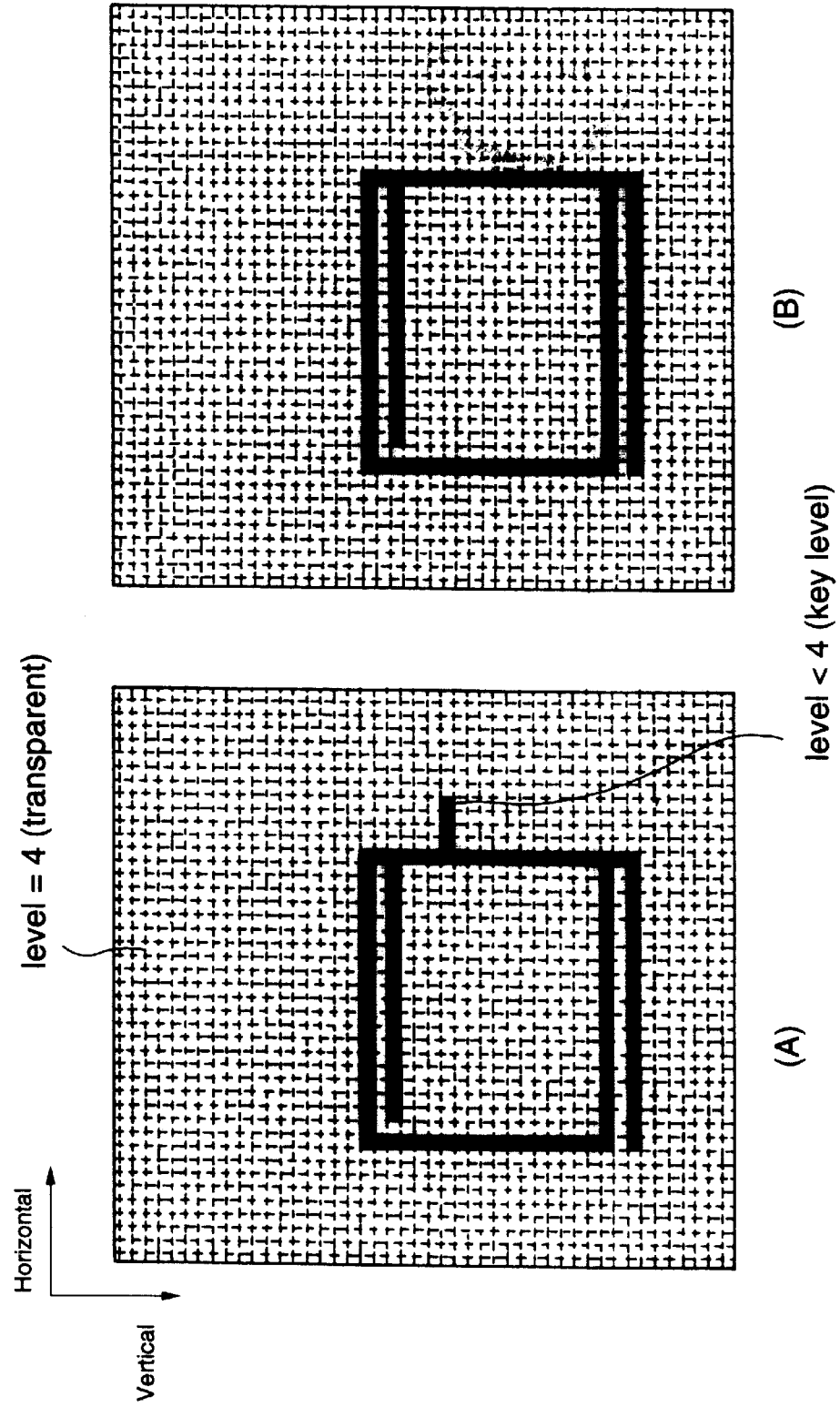
FIGS. 20(*a*) and 20(*b*) schematically illustrate bitmap data with and without noise added thereto.

The operation of noise removing filters 200 and 400, shown in FIGS. 4 and 11, in accordance with the present invention will now be described with reference to FIGS. 20 to 22. As previously discussed, bitmap data supplied in the form of an analog signal from, for example, scanner 56 of the encoding device shown in FIG. 11, is "smeared" when it is encoded by a subtitle encoder due to the frequency characteristics and bandwidth function of the analog devices. The smearing results from an "overshooting" and/ or "undershooting" of rises and falls in the bitmap data. FIG. 20(A) illustrates bitmap data which has been "smeared", and the subtitle represented the smeared bitmap data is of low quality.

In accordance with the present invention, noise removing filters are included in the data encoding and decoding devices, previously discussed, wherein noise removing filter 200 is located after quantization circuit 64 in the encoding device shown in FIG. 11 and noise removing filter 400 is located after filter 25 in the decoding device shown in FIG. 4. Each pixel, after quantization, is represented by four bits for a total number of 16 different values for each pixel. The first four levels 0 to 3 are utilized as key levels for "edge attachment" and the remaining levels 4 to 15 are utilized as fill data, such as described with reference to FIG. 9. For purposes of the present invention, it is assumed that level 4 represents the background video level, that is, the level at which no subtitle is present, such as the value of the fill data in time periods T1, T2, T4 and T5 shown in FIG. 9(b). Therefore, since key levels ordinarily should be 4 or greater, key levels that are less than 4 (i.e., key levels of 0 to 3) are considered to be "noise".

Figure 21:
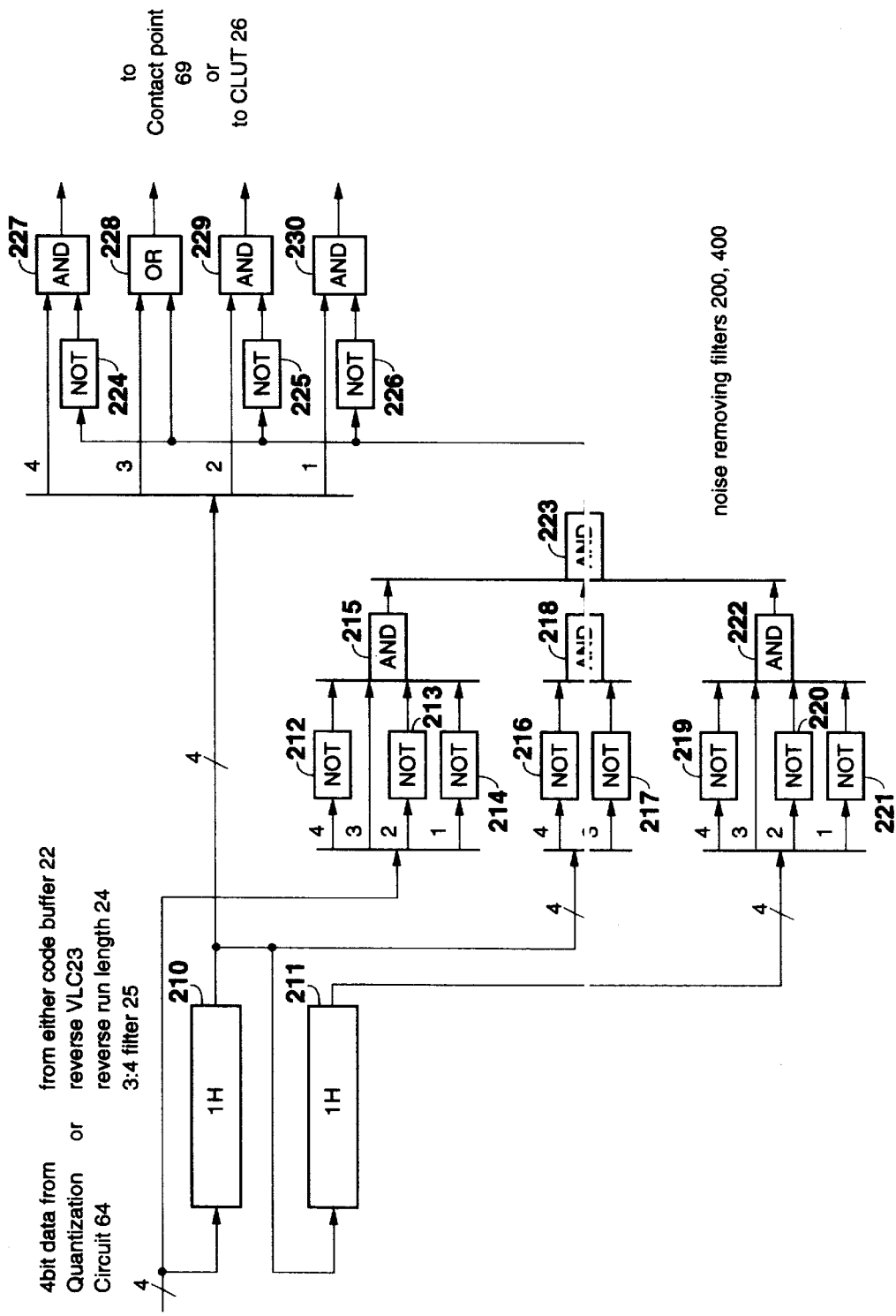
FIG. 21 is a block diagram of the noise removing filter in accordance with the present invention.

FIG. 21 is a block diagram of the noise removing filter (both filters 200 and 400) in accordance with the present invention. As shown, the noise removing filter is comprised of line delays 210 and 211 and boolean logic gate circuits 212–230. A horizontal line of pixel data, each pixel being comprised of 4 bits, successively is supplied to line delay 210 and also is supplied to gate circuits 212–215. Line delay 210 stores the horizontal line data therein and successively outputs the stored data as a delayed horizontal line after a delay equal to one horizontal line interval and supplies the delayed horizontal line to line delay 211. The delayed horizontal line output from delay line 210 also is supplied to gate circuits 216 and 217 and gate circuits 227–230. Line delay 211, like line delay 210, stores the delayed horizontal line data supplied thereto and successively outputs the stored data as a twice delayed horizontal line after a delay equal to one horizontal line interval. The twice delayed horizontal line is supplied to gate circuits 219–222.

For purposes of the present discussion, the horizontal line of pixel data supplied to the circuit of FIG. 21 (and supplied to line delay 210) is identified herein as a "previous pixel line", the delayed horizontal line output from delay line 210 is identified herein as a "current pixel line", and the twice delayed horizontal line output from delay line 211 is identified herein as a "subsequent pixel line". In accordance with the present invention, 4 bit data corresponding to a single pixel located in a "current pixel line" is considered to be noise when the 4 bit pixel value is less than 4, as previously discussed, and is located vertically between two pixels that both have pixels values corresponding to the background video level of 4. When such noise pixel is located vertically between two "background" pixels, the data of the noise pixel, in accordance with the present invention, is changed in the noise removing filter to the background level of 4. The circuit of FIG. 21 realizes this result.

As previously mentioned, the previous pixel line (i.e., the horizontal line of pixel data supplied to the noise removing filter of FIG. 21) is supplied to gate circuits 212–215, the current pixel line (the output of delay line 210) is supplied to gate circuits 216, 217, as well as to gate circuits 227–230, and the subsequent pixel line (the output of delay line 211) is supplied to gate circuits 219–222. The four bits of each pixel are supplied in parallel to the respective gate circuits, wherein bit 1 (the least significant bit), bit 2 and bit 4 (the most significant bit) of a pixel in the previous pixel line are supplied to NOT circuits 214, 213 and 212, respectively, which invert the respectively supplied bit values. The outputs of NOT circuits 212–214 and bit 3 of the pixel are supplied to AND circuit 215 which outputs a high value (i.e., a "true" value) when all of the supplied values are high thus effectively determining whether the 4 bit value of the supplied pixel in the previous pixel line is "0100" (binary), which corresponds to the value 4 (decimal).

Similarly, bits 1, 2 and 4 of the corresponding pixel in the subsequent pixel line are supplied to NOT circuits 221, 220 and 219, respectively, which invert the bit values supplied thereto and which supply their respective outputs to AND circuit 222. AND circuit 222 also is supplied with bit 3, which was not inverted, thus determining whether the 4 bit value of the supplied pixel in the subsequent pixel line is "0100", which corresponds to the value 4.

Bits 3 and 4 (the two most significant bits) of the corresponding pixel in the current pixel line are supplied to NOT circuits 217 and 216, respectively, which invert the bit values supplied thereto and which supply their respective outputs to AND circuit 218. Since both bits 3 and 4 are "0" only when the 4 bit value of the pixel is less than 4, AND circuit 218 determines whether the pixel value is less than 4.

The outputs of AND gate circuits 215, 218 and 222 each are supplied to AND gate circuit 223 which outputs a high (or "true") value when the above discussed conditions are met. Namely, AND gate circuit outputs a high value when the pixel in a current pixel line is noise (as determined by gate circuits 216–218), the value of the corresponding pixel in the previous pixel line is 4 (as determined by gate circuits 212–215), and the value of the corresponding pixel in the subsequent pixel line is 4 (as determined by gate circuits 219–222). Thus, when AND gate circuit outputs a high value, the value of the pixel in the current pixel line is changed to the background level of 4, but when AND gate circuit outputs a low level, which indicates that all of the above discussed conditions are not met, the value of the pixel in the current pixel line is unchanged. Gate circuits 224–230 realize this result.

Bits 1, 2, 3 and 4 of a pixel in the current pixel line (output from line delay 210) are supplied to AND gate 230, AND gate 229, OR gate 228, and AND gate 227, respectively. The output of AND gate 223 is supplied to OR gate 228 and also is supplied to NOT circuits 224–226. The outputs of NOT circuits 224–226 are supplied to AND gates 227, 229 and 230, respectively. As can be appreciated, when the output of AND gate 223 is low, gates 227–230 output the respective bit values that are supplied thereto, but when the output of AND gate 223 is high, the outputs of gates 230, 229, 228 and 227 are forced to the respective levels of 0, 0, 1, 0, which correspond to the 4 bit pixel value "0010" or 4 (decimal). Thus, the circuit of FIG. 21 operates to change the value of a noise pixel to the background level of 4 when the pixels that are vertically adjacent to that noise pixel are at the background level.

FIG. 20(B) illustrates bitmap subtitle data having the noise pixels shown in FIG. 20(A) removed therefrom. FIG. 22(A) schematically illustrates the subtitle character "A" represented by pixel bitmap data having noise added thereto, and FIG. 22(B) schematically illustrates the subtitle character "A" represented by subtitle data in which noise is removed therefrom by either noise removing filters 200 or 400 in accordance with the present invention.

In accordance with another embodiment of the present invention, the noise removing filter is operable to change the 4 bit value of a noise pixel that is less than 4 when that noise pixel is located horizontally between and adjacent to two pixels that both have pixels values that correspond to the background video level of 4. The circuit of FIG. 21 is operable to carry out such noise removing if line delays 210 and 211 were replaced by pixel delays wherein the input to the noise removing filter would constitute a "previous pixel", the output of (pixel) delay 210 would be a "current pixel" and the output of (pixel) delay 211 would be a "subsequent pixel". Thus, the present invention also is operable to remove "smear" that has occurred in the vertical direction.

While the present invention has been particularly shown and described in conjunction with preferred embodiments thereof, it will be readily appreciated by those of ordinary skill in the art that various changes may be made without departing from the spirit and scope of the invention. For example, although the noise removing filter has been described as utilizing pixels that are vertically or horizontally adjacent to a noise pixel, the present invention is not limited to only pixels that are adjacent to a noise pixel, and may utilize the values of other pixels as well to determine whether the noise pixel should be changed to a background level pixel. For example, values of several vertically adjacent pixels above the noise pixel as well as several vertically adjacent pixels below the noise pixel may be utilized, and similarly for horizontally adjacent pixels.

As another example, although the present discussion is directed to digital video signals, the present invention is not limited solely to this type of signal and may be widely applied to removing noise from subtitle data in various other types of video signals.

Still further, although noise has been described herein as being a pixel value of less than 4, or less than the background pixel level, other levels may be used as well.

Therefore, it is intended that the appended claims be interpreted as including the embodiments described herein, the alternatives mentioned above, and all equivalents thereto.

What is claimed is:

1. Apparatus for encoding digital video data including picture data and subtitle data, comprising:

means for receiving subtitle data representing a subtitle having a plurality of pixels;

means for removing noise from said subtitle data in accordance with correlations between a respective pixel of a respective horizontal line of said subtitle data and a number of pixels located in a number of adjacent lines thereto;

means for encoding said subtitle data having noise removed therefrom; and means for multiplexing said picture data and said encoded subtitle data having noise removed therefrom, wherein the noise is removed from said subtitle data by the noise removing means before the multiplexing performed by the multiplexing means.

2. The apparatus of claim 1, wherein said means for removing includes means for ascertaining whether said respective pixel is a noise pixel and means for changing said noise pixel to a background level pixel when adjacent pixels are background level pixels.

3. The apparatus of claim 2, wherein said means for ascertaining is operable to ascertain said respective pixel to be a noise pixel when a value of said respective pixel is less than a value corresponding to a background level.

4. The apparatus of claim 2, wherein said means for changing is operable to change said noise pixel to a background level pixel when the pixels that are adjacent to and in vertical alignment with said noise pixel are background level pixels.

5. The apparatus of claim 2, wherein said means for changing is operable to change said noise pixel to a background level pixel when the pixels that are adjacent to and in horizontal alignment with said noise pixel are background level pixels.

6. The apparatus of claim 1, wherein said means for receiving successively receives horizontal lines of subtitle data each representing a respective horizontal line of pixels of said subtitle data; and said means for removing includes first delay means for delaying a received horizontal line of subtitle data to produce a first delayed line of subtitle data, second delay means for delaying said first delayed line of subtitle data to produce a second delayed line of subtitle data, and means for changing the pixel value of each pixel in the first delayed line to a background level value when said each pixel has a pixel value less than the background level value and corresponding pixels in the received horizontal line and the second delayed line to said each pixel both have pixel values equal to the background level value.

7. The apparatus of claim 1, further comprising means for quantizing the received subtitle data; and wherein said means for removing noise is operable to remove noise from the quantized subtitle data.

8. Apparatus for decoding digital video data including picture data and subtitle data, comprising:

means for receiving said digital video data including multiplexed picture data and subtitle data representing a subtitle having a plurality of pixels;

means for de-multiplexing said picture data and said subtitle data;

means for removing noise from said de-multiplexed subtitle data in accordance with correlations between a respective pixel of a respective horizontal line of said subtitle data and a number of pixels located in a number of adjacent lines thereto; and means for superimposing said subtitle represented by said subtitle data having noise removed therefrom onto a video image represented by said de-multiplexed picture data, wherein the noise is removed from said subtitle data by the noise removing means after the de-multiplexing is performed by the de-multiplexing means and before the superimposing is performed by the superimposing means.

9. The apparatus of claim 8, wherein said means for removing includes means for ascertaining whether said respective pixel is a noise pixel and means for changing said noise pixel to a background level pixel when adjacent pixels are background level pixels.

10. The apparatus of claim 9, wherein said means for ascertaining is operable to ascertain said respective pixel to be a noise pixel when a value of said respective pixel is less than a value corresponding to a background level.

11. The apparatus of claim 9, wherein said means for changing is operable to change said noise pixel to a background level pixel when the pixels that are adjacent to and in vertical alignment with said noise pixel are background level pixels.

12. The apparatus of claim 9, wherein said means for changing is operable to change said noise pixel to a background level pixel when the pixels that are adjacent to and in horizontal alignment with said noise pixel are background level pixels.

13. The apparatus of claim 8, wherein said means for receiving successively receives horizontal lines of subtitle data each representing a respective horizontal line of pixels of said subtitle data; and said means for removing includes first delay means for delaying a received horizontal line of subtitle data to produce a first delayed line of subtitle data, second delay means for delaying said first delayed line of subtitle data to produce a second delayed line of subtitle data, and means for changing the pixel value of each pixel in the first delayed line to a background level value when said each pixel has a pixel value less than the background level value and corresponding pixels in the received horizontal line and the second delayed line to said each pixel both have pixel values equal to the background level value.

14. Method of encoding digital video data including picture data and subtitle data, comprising the steps of:

receiving subtitle data representing a subtitle having a plurality of pixels;

removing noise from said subtitle data in accordance with correlations between a respective pixel of a respective horizontal line of said subtitle data and a number of pixels located in a number of adjacent lines thereto;

encoding said subtitle data having noise removed therefrom; and multiplexing said picture data and said encoded subtitle data having noise removed therefrom, wherein the noise is removed from said subtitle data by the removing step before the multiplexing performed by the multiplexing step.

15. The method of claim 14, wherein said step of removing includes the steps of ascertaining whether said respective pixel is a noise pixel and changing said noise pixel to a background level pixel when adjacent pixels are background level pixels.

16. The method of claim 15, wherein said step of ascertaining is carried out by ascertaining said respective pixel to be a noise pixel when a value of said respective pixel is less than a value corresponding to a background level.

17. The method of claim 15, wherein said step of changing is carried out by changing said noise pixel to a background level pixel when the pixels that are adjacent to and in vertical alignment with said noise pixel are background level pixels.

18. The method of claim 15, wherein said step of changing is carried out by changing said noise pixel to a background level pixel when the pixels that are adjacent to and in horizontal alignment with said noise pixel are background level pixels.

19. The method of claim 14, wherein said step of receiving is carried out by successively receiving horizontal lines of subtitle data each representing a respective horizontal line of pixels of said subtitle; and said step of removing includes the steps of:

delaying a received horizontal line of subtitle data to produce a first delayed line of subtitle data, delaying said first delayed line of subtitle data to produce a second delayed line of subtitle data, and changing the pixel value of each pixel in the first delayed line to a background level value when said each pixel has a pixel value less than the background level value and corresponding pixels in the received horizontal line and the second delayed line to said each pixel both have pixel values equal to the background level value.

20. The method of claim 14, further comprising the step of quantizing the received subtitle data; and wherein said step of removing noise is carried out by removing noise from the quantized subtitle data.

21. Method of decoding digital video data including picture data and subtitle data, comprising the steps of:

receiving said digital video data including multiplexed picture data and subtitle data representing a subtitle having a plurality of pixels;

de-multiplexing said picture data and said subtitle data;

removing noise from said de-multiplexed subtitle data in accordance with correlations between a respective pixel of a respective horizontal line of said subtitle and a number of pixels located in a number of adjacent lines thereto; and superimposing said subtitle represented by said subtitle data having noise removed therefrom onto a video image represented by said de-multiplexed picture data, wherein the noise is removed from said subtitle data by the noise removing step after the de-multiplexing is performed by the de-multiplexing step and before the superimposing is performed by the superimposing step.

22. The method of claim 21, wherein said step of removing includes the steps of ascertaining whether said respective pixel is a noise pixel and changing said noise pixel to a background level pixel when adjacent pixels are background level pixels.

23. The method of claim 22, wherein said step of ascertaining is carried out by ascertaining said respective pixel to be a noise pixel when a value of said respective pixel is less than a value corresponding to a background level.

24. The method of claim 22, wherein said step of changing is carried out by changing said noise pixel to a background level pixel when the pixels that are adjacent to and in vertical alignment with said noise pixel are background level pixels.

25. The method of claim 22, wherein said step of changing is carried out by changing said noise pixel to a background level pixel when the pixels that are adjacent to and in horizontal alignment with said noise pixel are background level pixels.

26. The method of claim 21, wherein said step of receiving is carried out by successively receiving horizontal lines of subtitle data each representing a respective horizontal line of pixels of said subtitle; and said step of removing includes the steps of:

delaying a received horizontal line of subtitle data to produce a first delayed line of subtitle data, delaying said first delayed line of subtitle data to produce a second delayed line of subtitle data, and changing the pixel value of each pixel in the first delayed line to a background level value when said each pixel has a pixel value less than the background level value and corresponding pixels in the received horizontal line and the second delayed line to said each pixel both have pixel values equal to the background level value.

27. Apparatus for removing noise from subtitle data for use with at least one of an encoding device for encoding digital video data including picture data and said subtitle data and a decoding device for decoding encoded digital video data including encoded picture data and subtitle data, said subtitle data representing a subtitle having a plurality of pixels, comprising:

means for ascertaining whether a respective pixel of a respective horizontal line in said subtitle is a noise pixel;

means for determining if a number of pixels located in a number of adjacent lines thereto in said subtitle are background level pixels; and means for changing the subtitle data representing said respective pixel to a background level representing a background level pixel when said means for ascertaining ascertains said respective pixel to be a noise pixel and said means for determining determines the number of adjacent located pixels to be background level pixels, wherein the noise is removed from said subtitle data before a multiplexing operation is performed in which said picture data and encoded subtitle data having the noise removed therefrom are multiplexed when the apparatus for removing noise is used with the encoding device, and wherein the noise is removed from said subtitle data after a de-multiplexing operation is performed in which multiplexed picture data and subtitle data is de-multiplexed and before a superimposing operation is performed in which said subtitle represented by said subtitle data having noise removed therefrom is superimposed onto a video image represented by said de-multiplexed picture data when the apparatus for removing noise is used with the decoding device.

28. The apparatus of claim 27, wherein said means for ascertaining is operable to ascertain said respective pixel to be a noise pixel when the subtitle data representing said respective pixel is less than said background level.

29. The apparatus of claim 27, wherein said means for determining is operable to determine if pixels adjacent to and in vertical alignment with said respective pixel in said subtitle are background level pixels.

30. Method of removing noise from subtitle data for use with at least one of an encoding method for encoding digital video data including picture data and said subtitle data and a decoding method for decoding encoded digital video data including encoded picture data and subtitle data, said subtitle data representing a subtitle having a plurality of pixels, comprising the steps of:

ascertaining whether a respective pixel of a respective horizontal line in said subtitle is a noise pixel;

determining if a number of pixels located in a number of adjacent lines thereto in said subtitle are background level pixels; and changing the subtitle data representing said respective pixel to a background level representing a background level pixel when said respective pixel is ascertained to be a noise pixel and the number of adjacent located pixels are determined to be background level pixels, wherein the noise is removed from said subtitle data before a multiplexing operation is performed in which said picture data and encoded subtitle data having the noise removed therefrom are multiplexed when the method for removing noise is used with the encoding method, and wherein the noise is removed from said subtitle data after a de-multiplexing operation is performed in which multiplexed picture data and subtitle data is de-multiplexed and before a superimposing operation is performed in which said subtitle represented by said subtitle data having noise removed therefrom is superimposed onto a video image represented by said de-multiplexed picture data when the method for removing noise is used with the decoding method.

31. The method of claim 30, wherein said step of ascertaining is carried out by ascertaining said respective pixel to be a noise pixel when the subtitle data representing said respective pixel is less than said background level.

32. The method of claim 30, wherein said step of determining is carried out by determining if pixels adjacent to and in vertical alignment with said respective pixel in said subtitle are background level pixels.

* * * * *